United States Patent
Mok et al.

(10) Patent No.: US 11,167,251 B2
(45) Date of Patent: Nov. 9, 2021

(54) POROUS MEMBRANES INCLUDING PENTABLOCK COPOLYMERS AND METHOD OF MAKING THE SAME

(71) Applicant: 3M INNOVATIVE PROPERTIES COMPANY, St. Paul, MN (US)

(72) Inventors: Michelle M. Mok, St. Paul, MN (US); Carl A. Laskowski, Minneapolis, MN (US); Lucas D. McIntosh, Minneapolis, MN (US); Hyacinth L. Lechuga, St. Paul, MN (US); Timothy M. Gillard, St. Paul, MN (US); Clinton P. Waller, Jr., White Bear Lake, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 154 days.

(21) Appl. No.: 16/339,832

(22) PCT Filed: Nov. 14, 2017

(86) PCT No.: PCT/US2017/061496
§ 371 (c)(1),
(2) Date: Apr. 5, 2019

(87) PCT Pub. No.: WO2018/097988
PCT Pub. Date: May 31, 2018

(65) Prior Publication Data
US 2020/0047135 A1    Feb. 13, 2020

Related U.S. Application Data

(60) Provisional application No. 62/425,334, filed on Nov. 22, 2016.

(51) Int. Cl.
*B01D 71/80* (2006.01)
*B01D 69/08* (2006.01)

(52) U.S. Cl.
CPC .......... *B01D 71/80* (2013.01); *B01D 69/08* (2013.01); *B01D 2325/02* (2013.01)

(58) Field of Classification Search
CPC ............ C08F 297/046; C08F 297/04; C08F 297/023; C08F 8/12; C08F 2810/40;
(Continued)

(56) References Cited

U.S. PATENT DOCUMENTS

| 3,133,132 A | 5/1964 | Loeb |
| 3,283,042 A | 11/1966 | Loeb |

(Continued)

FOREIGN PATENT DOCUMENTS

| CA | 2886437 | 5/2014 |
| CN | 103861480 | 6/2014 |

(Continued)

OTHER PUBLICATIONS

Cohen, "Cobalt Catalysts for the Alternating Copolymerization of Propylene Oxide and Carbon Dioxide: Combining High Activity and Selectivity", Journal of the American Chemical Society, Aug. 2005, vol. 127, No. 31, pp. 10869-10878.

(Continued)

*Primary Examiner* — Vishal V Vasisth
(74) *Attorney, Agent, or Firm* — Adrian L. Pishko

(57) ABSTRACT

The present disclosure provides a porous membrane made of pentablock copolymer. The porous membrane includes an ABCBA block copolymer and has a number of pores. The A block is immiscible with each of the B block and the C block, the B block has a glass transition temperature ($T_g$) of 90 degrees Celsius or greater, and the C block has a $T_g$ of 25 degrees Celsius or less. The A block comprises a poly (alkylene oxide), a substituted epoxide, a polylactam, or a substituted carbonate; B block comprises a vinyl aromatic monomer or a polyalkylmethacrylate and C block comprises (Continued)

a polyacrylate, a polysiloxane or a polyisoprene. A method of making a porous membrane is also provided. The method includes forming a film or a hollow fiber from a solution including a solvent and solids containing an ABCBA block copolymer. The method further includes removing at least a portion of the solvent from the film or the hollow fiber and contacting the film or the hollow fiber with a nonsolvent.

16 Claims, 13 Drawing Sheets

(58) Field of Classification Search
CPC ........ B01D 71/80; B01D 69/06; B01D 69/08; B01D 69/02; B01D 69/141; B01D 2325/02; B01D 71/40; B01D 71/50; C08G 65/2612; C08G 2650/24; C08L 71/02

See application file for complete search history.

(56) References Cited

U.S. PATENT DOCUMENTS

| | | |
|---|---|---|
| RE27,145 E | 6/1971 | Jones |
| 3,971,373 A | 7/1976 | Braun |
| 4,039,593 A | 8/1977 | Kamienski |
| 4,100,324 A | 7/1978 | Anderson |
| 4,258,144 A | 3/1981 | Childers |
| 4,429,001 A | 1/1984 | Kolpin |
| 5,145,727 A | 9/1992 | Potts |
| 5,149,576 A | 9/1992 | Potts |
| 5,321,148 A | 6/1994 | Schwindeman |
| 5,750,055 A | 5/1998 | Van Der Steen |
| 6,160,054 A | 12/2000 | Schwindeman |
| 6,184,338 B1 | 2/2001 | Schwindeman |
| 6,197,891 B1 | 3/2001 | Schwindeman |
| 6,221,991 B1 | 4/2001 | Letchford |
| 6,492,469 B2 | 12/2002 | Willis |
| 7,884,160 B2 | 2/2011 | Wang |
| 8,652,631 B2 | 2/2014 | Zoller |
| 9,527,041 B2 | 12/2016 | Wiesner |
| 9,592,477 B2 | 3/2017 | Aamer |
| 9,914,099 B2 | 3/2018 | Peinemann |
| 2009/0173694 A1* | 7/2009 | Peinemann ............ B01D 71/80 210/650 |
| 2011/0189463 A1 | 8/2011 | Moore |
| 2012/0318741 A1 | 12/2012 | Peinemann |
| 2013/0015071 A1 | 1/2013 | Willis |
| 2013/0190408 A1 | 7/2013 | Scholz |
| 2014/0217012 A1 | 8/2014 | Wiesner |
| 2014/0343177 A1 | 11/2014 | Willis |
| 2015/0151256 A1 | 6/2015 | Abetz |
| 2015/0217237 A1 | 8/2015 | Abetz |
| 2015/0343395 A1 | 12/2015 | Aamer |
| 2015/0343396 A1 | 12/2015 | Aamer |
| 2015/0344639 A1 | 12/2015 | Aamer |
| 2016/0023171 A1 | 1/2016 | Phillip |

FOREIGN PATENT DOCUMENTS

| | | |
|---|---|---|
| DE | 102012207338 | 11/2013 |
| DE | 102012207344 | 11/2013 |
| DE | 102014213027 | 1/2016 |
| GB | 2147586 | 5/1985 |
| WO | WO 1996-011238 | 4/1996 |
| WO | WO 2014-079538 | 5/2014 |
| WO | WO 2015-052579 | 4/2015 |
| WO | WO 2015-153750 | 10/2015 |
| WO | WO 2018-098023 | 5/2018 |

OTHER PUBLICATIONS

Greene, Protective Groups in Organic Synthesis, Second Edition, p. 41, (1991).

Greene, Protective Groups in Organic Synthesis, Second Edition, pp. 80-83, (1991).
Hahn, "Structure Formation of Integral-Asymmetric Membranes of Polystyrene-block-Poly (ethylene oxide)", Journal of Polymer Science Part B: Polymer Physics, Jan. 2013, vol. 51, No. 4, pp. 281-290.
Hanley, "Phase Behavior of a Block Copolymer in Solvents of Varying Selectivity," Macromolecules, 2000, vol. 33, No. 16, pp. 5918-5931.
Hsieh, Anionic Polymerization: Principles and Practical Applications, Chapter 5: General Aspects of Anionic Polymerization, pp. 93-127 (1996).
Hsieh, Anionic Polymerization: Principles and Practical Applications, Chapter 23: Anionic Polymerization of Methyl Methacrylate and Related Polar Monomers, pp. 641-684 (1996).
Jeske, "Alternating Copolymerization of Epoxides and Cyclic Anhydrides: An Improved Route to Aliphatic Polyesters", Journal of the American Chemical Society, Sep. 2007, vol. 129, No. 37, pp. 11330-11331.
Jung, "Formation of Integral Asymmetric Membranes of AB Diblock and ABC Triblock Copolymers by Phase Inversion", Macromolecular Rapid Communications, Apr. 2013, vol. 34, No. 7, pp. 610-615.
Karunakaran, "Isoporous PS-b-PEO Ultrafiltration Membranes via Self-Assembly and Water-Induced Phase Separation", Journal of Membrane Science, Mar. 2014, vol. 453, pp. 471-477.
Kawakami, "Silicone Macromers for Graft Polymer Synthesis", Polymer Journal, Nov. 1982, vol. 14, No. 11, pp. 913-917.
Kawakami, "Synthesis and Copolymerization of Polysiloxane Macromers", ACS Polymer Preprints, Apr. 1984, vol. 25, No. 1, pp. 245-246.
Kawakami, "Synthesis of Silicone Graft Polymers and A Study of Their Surface-Active Properties", Macromolecular Chemistry and Physics, Jan. 1984, vol. 185, No. 1, pp. 9-18.
Koetsier, "Block Copolymers of Styrene, Isoprene, and Ethylene Oxide Prepared by Anionic Polymerization. I. Synthesis and Characterization," Journal of Polymer Science: Polymer Chemistry Edition, 1978, vol. 16, pp. 511-521.
Li, "Morphology and Wettability Control of Honeycomb Porous Films of Amphiphilic Fluorinated Pentablock Copolymers via Breath Figure Method", RSC Advances, Sep. 2014, vol. 4, No. 91, pp. 49655-49662.
Liu, "Fabrication of A Novel PS4VP/PVDF Dual-Layer Hollow Fiber Ultrafiltration Membrane", Journal of Membrane Science, May 2016, vol. 506, pp. 1-10.
Meuler, "Structure and Mechanical Properties of an $O^{70}$ (Fddd) Network-Forming Pentablock Terpolymer," Macromolecules, 2008, vol. 41, No. 15, pp. 5809-5817.
Mogi, "Preparation and Morphology of Triblock Copolymers of the ABC Type", Macromolecules, Feb. 1992, vol. 25, No. 20 pp. 5408-5411.
Ndoni, "Laboratory-Scale Setup for Anionic Polymerization under Inert Atmosphere", Review of Scientific Instruments, Feb. 1995, vol. 66, No. 2, pp. 1090-1095.
Noor, A Facile Method to Prepare Double-Layer Isoporous Hollow Fiber Membrane by In Situ Hydrogen Bond Formation in the Spinning Line, Macromolecular Rapid Communications, Mar. 2016, vol. 37, No. 5, pp. 414-419.
Patel, "Novel Thermosensitive Pentablock Copolymers for Sustained Delivery of Proteins in the Treatment of Posterior Segment Diseases", Protein and Peptide Letters, 2014, vol. 21, No. 11, pp. 1185-1200.
Phillip, "Tuning Structure and Properties of Graded Triblock Terpolymer-Based Mesoporous and Hybrid Films," Nano Letters, Jun. 2011, vol. 11, No. 7, pp. 2892-2900.
Stiriba, "Hyperbranched Molecular Nanocapsules: Comparison of the Hyperbranched, Architecture with the Perfect Linear Analogue," Journal of the American Chemical Society, Jul. 2002, vol. 124, No. 33, pp. 9698-9699.
Su, "Ring-Opening Polymerization". In: Principles of Polymer Design and Synthesis. Lecture Notes in Chemistry, 2013, vol. 82, Springer Berlin Heidelberg, pp. 267-299.

(56) References Cited

OTHER PUBLICATIONS

Thong, "Novel Nanofiltration Membranes Consisting of a Sulfonated Pentablock Copolymer Rejection Layer for Heavy Metal Removal", Environmental Science & Technology, Nov. 2014, vol. 48, No. 23, pp. 13880-13887.
Wente, "Manufacture of Super Fine Organic Fibers," Report No. 4364 of the Naval Research Laboratories, May 1954, 19 pages.
Wente, "Superfine Thermoplastic Fibers," Industrial Engineering Chemistry, 1956, vol. 48, pp. 1342-1346.
Xie, "Poly(dimethylsiloxane)-Based Polyurethane with Chemically Attached Antifoulants for Durable Marine Antibiofouling", ACS Applied Materials Interfaces, Sep. 2015, vol. 7, No. 38, pp. 21030-21037.
Zhang, "Nanomanufacturing of High-Performance Hollow Fiber Nanofiltration Membranes by Coating Uniform Block Polymer Films from Solution", Journal of Materials Chemistry A, Jan. 2017, vol. 5, No. 7, pp. 3358-3370.
Zhang, "Nanoporous Membranes Generated from Self-Assembled Block Polymer Precursors: Quo Vadis?", Journal of Applied Polymer Science, Jun. 2015, vol. 132, No. 21, 17 pages.
International Search Report for PCT International Application No. PCT/US2017/061496, dated Feb. 23, 2018, 5 pages.
International Search Report for PCT International Application No. PCT/US2017/062138, dated Mar. 9, 2018, 4 pages.

* cited by examiner

500nm

500nm

POROUS MEMBRANES INCLUDING PENTABLOCK COPOLYMERS AND METHOD OF MAKING THE SAME

CROSS REFERENCE TO RELATED APPLICATIONS

This application is a national stage filing under 35 U.S.C. 371 of PCT/US2017/061496, filed Nov. 14, 2017, which claims the benefit of U.S. Application No. 62/425,334, filed Nov. 22, 2016, the disclosure of which is incorporated by reference in their entireties herein.

TECHNICAL FIELD

The present disclosure relates to the field of porous polymeric membranes.

BACKGROUND

Porous materials are materials that have porous structures that enable fluids to pass readily through them. Porous membranes enjoy utility in a wide range of divergent applications, including use in fluid filtration to remove solid particulates, use in ultrafiltration to remove colloidal matter from fluids, use as diffusion barriers or separators in electrochemical cells, and uses in gas separation and pervaporation. Porous membranes have also been used in the filtration of antibiotics, beers, oils, bacteriological broths, and for the analysis of air, microbiological samples, intravenous fluids and vaccines.

Porous membranes based on block copolymers are of interest. Recently, the combination of solvent induced phase separation (SIPS) with block copolymer materials has been shown to yield membranes with unique isoporous morphologies and also high flux. Previously described isoporous membranes have been formed from diblock poly(styrene-b-vinylpyridine) (SV) and triblock poly(isoprene-styrene-vinylpyridine) (ISV) copolymers. These materials have enjoyed success due to (1) their ability to form micelles with a diameter of 10 s of nm, (2) their solubility characteristics in a handful of water-miscible solvents, and (3) their ability to be synthesized in a straightforward fashion through anionic polymerization. However, the use of SV and ISV in the commercial production of a filtration membrane is highly unlikely due to a number of factors. The brittle nature of the cast membranes limits their tolerance to bending and handling. Additionally, their synthesis requires the use of temperatures below −70° C., making scale-up exceptionally challenging.

SUMMARY

The present disclosure provides a porous membrane and a method of making a porous membrane.

In a first aspect, a porous membrane is provided. The porous membrane includes an ABCBA block copolymer and the membrane contains a number of pores; where the A block is immiscible with each of the B block and the C block; where the B block has a glass transition temperature ($T_g$) of 90 degrees Celsius or greater and is present in an amount ranging from 30% to 80% by weight, inclusive, of the total block copolymer; and where the C block has a $T_g$ of 25 degrees Celsius or less and is present in an amount ranging from 10% to 40% by weight, inclusive, of the total block copolymer.

In a second aspect, a method of making a porous membrane is provided. The method includes forming a film or a hollow fiber from a solution, the solution including a solvent and solids including an ABCBA block copolymer; removing at least a portion of the solvent from the film or the hollow fiber; and contacting the film or the hollow fiber with a nonsolvent, thereby forming the porous membrane containing a number of pores.

Specifically, the porous membranes display significant improvements in toughness and tensile strength relative to porous membranes including triblock copolymer materials of similar composition and total molecular weight. Features and advantages of the present disclosure will be further understood upon consideration of the detailed description as well as the appended claims.

DETAILED DESCRIPTION

Figure 1A:
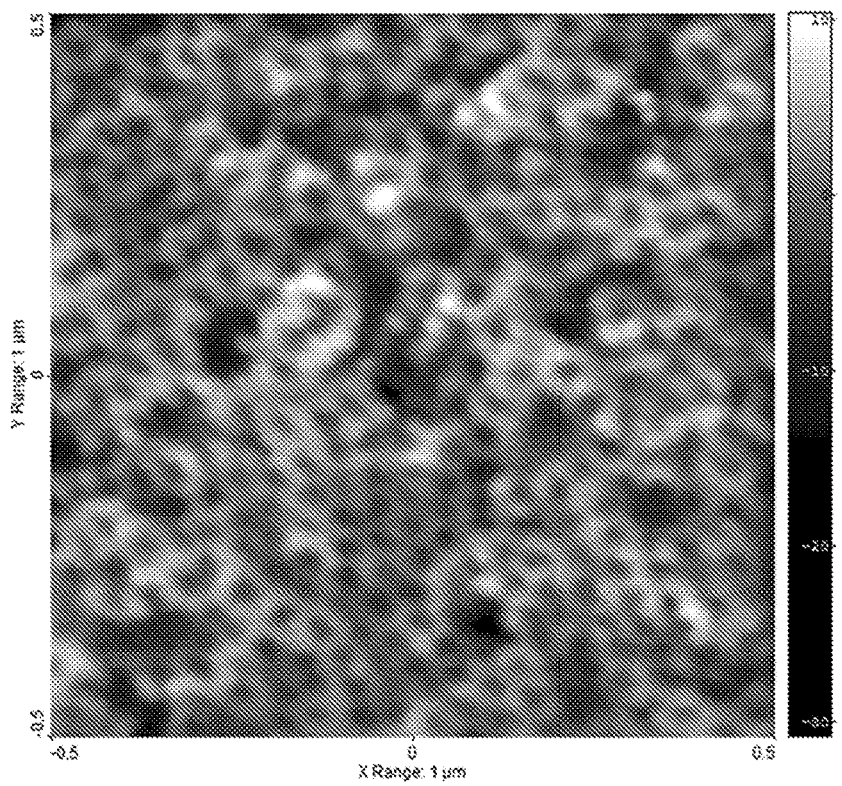
FIG. 1A is an atomic force microscope (AFM) topography image of a surface of a membrane prepared according to an exemplary embodiment of the present disclosure.

The present disclosure provides porous membranes including pentablock copolymers. In certain embodiments, the porous membranes are prepared by solvent induced phase separation of an ABCBA pentablock copolymer containing a rubbery C block and glassy B blocks. This is believed to be the first time pentablock copolymer materials have been used in the preparation of porous or isoporous membranes. The pentablock architecture tends to result in membranes that are mechanically stronger than those made with analogous AB diblock or ABC triblock copolymers.

In a first aspect, a porous membrane is provided. The porous membrane comprises an ABCBA block copolymer, and the membrane comprises a plurality of pores; wherein the A block is immiscible with each of the B block and the C block; wherein the B block has a $T_g$ of 90 degrees Celsius or greater and is present in an amount ranging from 30% to 80% by weight, inclusive, of the total block copolymer; and wherein the C block has a $T_g$ of 25 degrees Celsius or less and is present in an amount ranging from 10% to 40% by weight, inclusive, of the total block copolymer.

In a second aspect, a method of making a porous membrane is provided. The method includes forming a film or a hollow fiber from a solution, the solution comprising a solvent and solids comprising an ABCBA block copolymer; removing at least a portion of the solvent from the film or the hollow fiber; and contacting the film or the hollow fiber with a nonsolvent, thereby forming the porous membrane comprising a plurality of pores.

The below disclosure relates to both the first aspect and the second aspect.

The "B" block of the copolymer comprises polymeric units that form hard, glassy domains upon polymerization, with the B block having a $T_g$ of at least 50° C., preferably at least 70° C., and more preferably at least 90° C. $T_g$ can be determined using differential scanning calorimetry. The B block polymer domain comprises a total of 30 to 80 weight percent of the pentablock copolymer.

The hard B blocks are typically selected from vinyl aromatic monomers and include, for example, styrene, α-methylstyrene, para-methylstyrene, 4-methylstyrene, 3-methylstyrene, 4-ethylstyrene, 3,4-dimethylstyrene, 2,4,6-trimethylstyrene, 3-tert-butyl-styrene, 4-tert-butylstyrene, 4-methoxystyrene, 4-trimethylsilylstyrene, 2,6-dichlorostyrene, vinyl naphthalene, and vinyl anthracene.

In some embodiments, the B block comprises a polyalkylmethacrylate. Exemplary B blocks include for instance and without limitation, styrene, p-methylstyrene, alpha-methylstyrene, poly(tert-butylstyrene), and polymethylmethacrylate.

The nature and composition of the monomers which make up the individual C block is not particularly critical so long as the polymerized monomers provide a phase which meets the glass temperature requirement and, thus, can be described as "amorphous," "soft" or "rubbery." These terms are used interchangeably throughout the specification. It will be understood that "amorphous" blocks contain no or negligible amounts of crystallinity.

In particular embodiments, each block C is independently selected from the group consisting of polymerized (i) conjugated diene monomers, or (ii) a silicon polymer, and (iii) mixtures of monomers wherein segments containing polymerized conjugated diene monomers are optionally hydrogenated. Suitable conjugated dienes include, e.g., butadiene, isoprene, and the like, as well as 1,3-cyclodiene monomers, such as 1,3-cyclohexadiene, 1,3-cycloheptadiene and 1,3-cyclooctadiene, preferably 1,3-cyclohexadiene. When the C blocks of conjugated acyclic dienes such as butadiene or mixtures thereof are optionally hydrogenated, such blocks should have a vinyl content of from 0 to 40 mole percent post hydrogenation. C blocks resulting from hydrogenation include, but are not limited to, poly(ethylene-alt-propylene), poly(butylene), poly(ethylene-co-butylene), and poly(ethylene-co-propylene-co-butylene).

Additionally, the C blocks may be polymer blocks of silicon rubber segments, i.e., blocks of organopolysiloxanes having recurring units of —[Si($R^{10}$)$_2$—O]— wherein each $R^{10}$ denotes an organic radical, e.g., alkyl, cycloalkyl or aryl. Such blocks of organopolysiloxanes may be prepared by anionic polymerization of cyclic siloxanes of the general formula —[Si($R^{10}$)$_2$—O]$_r$—, where subscript r is 3 to 7. Cyclic siloxanes where subscript r is 3 or 4, and $R^{10}$ is methyl are preferred. Anionic polymerization of hexamethylcyclotrisiloxane monomer is generally described in Y. Yamashita et al. (for example, in Polymer J. 14, 913 (1982); ACS Polymer Preprints 25 (1), 245 (1984); Makromol. Chem. 185, 9 (1984).

In some embodiments, the C block comprises a polyacrylate or a polysiloxane. Exemplary C blocks include for instance and without limitation, polyisoprene, polybutadiene, polyisobutylene, polydimethylsiloxane, polyethylene, poly(ethylene-alt-propylene), poly(ethylene-co-butylene-co-propylene), polybutylene, and poly(ethylene-stat-butylene).

The "C" block of the pentablock copolymer is substantially free of functional groups. Additionally, each of such blocks C may have a number average molecular weight of from about 1,000 to 200,000 and may have a glass transition temperature, $T_g$, of ≤20° C., preferably ≤0° C. The soft "C" block comprises a total of 10 to 40 weight percent of the pentablock block polymer. The combined B and C blocks comprise 70 to 95 weight percent of the pentablock polymeric units The A blocks comprise a copolymer block immiscible in the B and C blocks. The immiscible component of the copolymer shows multiple amorphous phases as determined, for example, by the presence of multiple amorphous glass transition temperatures using differential scanning calorimetry or dynamic mechanical analysis. As used herein, "immiscibility" refers to polymer components with limited solubility and non-zero interfacial tension, that is, a blend whose free energy of mixing is greater than zero:

$$\Delta G \cong \Delta H_m > 0$$

Miscibility of polymers is determined by both thermodynamic and kinetic considerations. Common miscibility predictors for non-polar polymers are differences in solubility parameters or Flory-Huggins interaction parameters. For polymers with non-specific interactions, such as polyolefins, the Flory-Huggins interaction parameter can be calculated by multiplying the square of the solubility parameter difference with the factor (V/RT), where V is the molar volume of the amorphous phase of the repeated unit, R is the gas constant, and T is the absolute temperature. As a result, the Flory-Huggins interaction parameter between two non-polar polymers is always a positive number.

In certain embodiments, the A block comprises a poly (alkylene oxide), a substituted epoxide, a polylactam, or a substituted carbonate. Exemplary A blocks include for instance and without limitation, poly(D-lactide), poly(L-lactide), poly(D/L-lactide), polyethyleneoxide, poly(propylene oxide), poly(ethyoxyethylglycidylether), poly(4-vinylpyridine), poly(2-vinylpyridine), polyhydroxystyrene, polyacrylamide, polyacrylic acid, poly(methacrylic acid), polydimethylacrylamide, poly(N-isopropylacrylamide), polyhydroxyethylmethacrylate, poly-ε-caprolactone, and poly(propylenecarbonate).

The A blocks are derived from ring-opening anionic polymerization of cyclic monomers or dimers selected from oxiranes (epoxides) to produce polyethers, cyclic sulfides to produce polythioethers, lactones and lactides to produce polyesters, cyclic carbonates to produce polycarbonates, lactams to produce polyamides and aziridines to produce polyamines. Polycarbonates may also be prepared by metal-catalyzed polymerization of carbon dioxide with epoxides listed previously (as described in Journal of the American Chemical Society, 2005, pg. 10869).

Useful epoxides include $C_2$-$C_{10}$, preferably $C_2$-$C_4$ alkyl epoxides. In particular ethylethoxy-glycidyl ether, ethylene, propylene, and butylene oxides.

Suitable lactones and lactams are those having 3 to 12 carbon atoms in the main ring and are of the general formula:

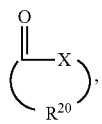

wherein $R^{20}$ is an alkylene moiety that may be linear or branched having 1 to 20 carbon atoms, preferably 1 to 12 carbon atoms optionally substituted by catenary (in-chain) oxygen atoms, carbonyls or carboxylates; and X is —O— or $NR^1$—, where $R^1$ is $C_1$-$C_4$ alkyl. It will be appreciated that the cyclic lactones are derived from hydroxy acids including 3-hydroxybutyrate, 4-hydroxybutyrate, 3-hydroxyvalerate, lactic acid, 3-hydroxypropanoate, 4-hydropentanoate, 3-hydroxypentanoate, 3-hydroxyhexanoate, 3-hydroxyheptanoate, 3-hydroxyoctanoate, dioxanone, valerolactone, caprolactone, and glycolic acid. The lactams are derived from the corresponding aminoacids. Dimers of the hydroxy acids, such as lactide may be used.

Useful lactams include 2-pyrrolidone, 2-piperidone, caprolactam, lauryllactam and mixtures thereof.

Useful cyclic carbonates include 5-membered to 7-membered cyclic carbonates. In embodiments, cyclic components comprise trimethylene carbonate, neopentyl glycol carbonate, 2,2,4-trimethyl-1,3-pentanediol carbonate, 2,2-dimethyl-1,3-butanediol carbonate, 1,3-butanediol carbonate, 2-methyl-1,3-propanediol carbonate, 2,4-pentanediol carbonate, 2-methyl-butane-1,3-diol carbonate, ethylene carbonate, and propylene carbonate.

Suitable cyclic anhydrides include, but are not limited to, aliphatic dicarboxylic anhydrides, such as, succinic anhydride, glutaric anhydride, maleic anhydride and combinations thereof.

Example of aziridine monomers comprise aziridine and its alkyl-substituted homologues.

Suitable cyclic ethers include 5-membered to 7-membered cyclic ethers

Reference to suitable ring-opening polymerizable monomers may be found in Frisch, Kurt Charles; Reegan, Sidney L; Ring-opening polymerization: Kinetics and mechanisms of polymerization, Dekker Publishing, NY; 1969 and in Su, Wei-Fang, Ring-Opening Polymerization in Principles of Polymer Design and Synthesis; Springer Berlin Heidelberg, pp. 267-299, 2013.

Anionic polymerizations and copolymerizations include one or more polymerization initiators. Carbon-centered propagating anions will often require differing initiators from those used to produce oxygen-centered propagating anions.

Suitable initiators include alkali metal hydrocarbons such as alkyl or aryl lithium, sodium, or potassium compounds containing up to 20 carbon atoms in the alkyl or aryl radical or more, preferably up to 8 carbon atoms. Examples of such compounds are benzylsodium, ethylsodium, propylsodium, phenylsodium, butylpotassium, octylpotassium, benzylpotassium, benzyllithium, methyllithium, ethyllithium, n-butyllithium, sec-butyllithium, tert-butyllithium, phenyllithium, and 2-ethylhexyllithium. Lithium compounds are preferred as initiators.

Initiators particularly useful with specific monomers are well known in the art. Initiators compatible with the exemplary monomer systems discussed herein are summarized in Hsieh et al., Anionic Polymerization: Principles and Practical Applications, Ch. 5, and 23 (Marcel Dekker, New York, 1996).

Examples include, for example, alkyl lithium compounds such as s-butyllithium, n-butyllithium, tert-butyllithium, amyllithium and the like and other organo lithium compounds including di-initiators such as the di-sec-butyl-lithium adduct of m-diisopropenyl benzene and the tert-butyllithium adduct of 1-bis(phenyl)vinylbenzene. Further suitable di-initiators are disclosed in U.S. Pat. No. 6,492,469. Of the various polymerization initiators, s-butyllithium is preferred. The initiator can be used in the polymerization mixture (including monomers and solvent) in an amount calculated on the basis of one initiator molecule per desired polymer chain. The lithium initiator process is well known and is described in, for example, U.S. Pat. No. 4,039,593 and Re. 27,145.

Molecular weight is determined by the initiator/monomer ratio, and thus the amount of initiator may vary from about 0.0001 to about 0.2 mole of organometallic initiator per mole of monomer. Preferably, the amount will be from about 0.002 to about 0.04 mole of initiator per mole of monomer. For the initiation of carbon-centered anionic polymerization, an inert preferably nonpolar organic solvent can be utilized. Anionic polymerization of cyclic monomers that yield an oxygen-centered anion and lithium cation require either a strong polar solvent such as tetrahydrofuran, dimethyl sulfoxide, or hexamethylphosphorous triamide, or a mixture of such polar solvent with nonpolar aliphatic, cycloaliphatic, or aromatic hydrocarbon solvent such as hexane, heptane, octane, cyclohexane, or toluene.

In one embodiment, the polymerization of monomers into the triblock polymer is initiated via addition of divalent anionic initiators that are known in the art as useful in the copolymerization of diene monomers and vinyl aromatic hydrocarbons. Such initiators can be selected from organic compounds comprising 2 lithium groups as represented by the formula as shown below:

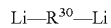

wherein $R^{30}$ is a divalent hydrocarbon group. $R^{30}$ generally contains 4 to 30 carbon atoms per $R^{30}$ group. Useful difunctional initiators are described in U.S. Pat. No. 7,884, 160 (Wang et al.), and U.S. Pat. No. 5,750,055 (Van Der Steen et. al), incorporated herein by reference.

Other bi-functional anionic initiators include, but are not limited to, 1,4-dilithiobutane, 1,5-dilithiopentane, 1,10-dilithiodecane, 1,20-dilithioeicosane, 1,4-dilithiobenzene, 1,4-dilithionaphthalene, 1,10-dilithioanthracene, 1,2-dilithio-1,2-diphenylethane, and the like, and mixtures thereof.

Generally, the polymerization can be carried out at a temperature ranging from about −78° C. to about 100° C., preferably from about 0° C. to about 60° C. Anhydrous conditions and an inert atmosphere such as nitrogen, helium, or argon are typically required.

Termination of the anionic polymerization is, in general, achieved via direct reaction of the living polymeric anion with protic solvents. Termination with halogen-containing terminating agents, i.e., functionalized chlorosilanes, can produce, for example, vinyl-terminated polymeric monomers. Such terminating agents may be represented by the general formula $X-(Y)_n-Si(R)_{3-m}Cl_m$, where m is 1, 2, or 3 and where X, Y, n, and R have been previously defined. Preferred terminating agents are chlorotrimethylsilane or methacryloxypropyldimethylchlorosilane. The termination reaction is carried out by adding a slight molar excess of the terminating agent (relative to the amount of initiator) to the living polymer at the polymerization temperature.

It is recognized that transitioning from a carbon-centered propagating anion to an oxygen-centered propagating anion can be used as a method for terminating an anionic polymerization of vinyl aromatics or conjugated dienes. For example, addition of oxiranes like ethylene oxide to the styrenic anion produced during styrene polymerization can lead to end-capping of the polymer chain with a hydroxyl, oxygen-centered anionic functionality. The reduced nucleophilicity of the oxygen-centered anion prevents further polymerization of any vinyl aromatic or conjugated diene present, thus ethylene oxide acts as a terminating agent in one sense, yet also forms an initiator for further ring-opening polymerizations (as in Hsieh et al., Anionic Polymerization: Principles and Practical Applications, Ch. 5, and 23 (Marcel Dekker, New York, 1996)).

Functional anionic initiators can also be used to provide end-functionalized polymers. These initiators are typically suitable for initiating the recited monomers using techniques known to those skilled in the art. Various functional groups can be incorporated onto the end of a polymer chain using this strategy including: alcohol(s), thiol(s), carboxylic acid, and amine(s). In each of these cases, the initiator must contain protected functional groups that can be removed using post polymerization techniques. Suitable functional initiators are known in the art and are described in, e.g., U.S. Pat. No. 6,197,891 (Schwindeman et al.); U.S. Pat. No. 6,160,054 (Periera et al.); U.S. Pat. No. 6,221,991 (Letchford et al.); U.S. Pat. No. 6,184,338 (Schwindeman et al.); and U.S. Pat. No. 5,321,148 (Schwindeman et al.); each incorporated herein by reference.

These initiators contain tertiary alkyl or trialkylsilyl protecting groups that can be removed by post polymerization deprotection. Tert-alkyl-protected groups can also be removed by reaction of the polymer with para-toluenesulfonic acid, trifluoroacetic acid, or trimethylsilyliodide to produce alcohol, amino, or thiol functionalities. Additional methods of deprotection of the tert-alkyl protecting groups can be found in T. W. Greene and P. G. M. Wuts, Protective Groups in Organic Synthesis, Second Edition, Wiley, New York, 1991, page 41. Tert-butyldimethylsilyl protecting groups can be removed by treatment of the polymer with acid, such as hydrochloric acid, acetic acid, para-toluenesulfonic acid. Alternatively, a source of fluoride ions, for instance tetra-n-butylammonium fluoride, potassium fluoride and 18-crown-6, or pyridine-hydrofluoric acid complex, can be employed for deprotection of the tert-butyldimethylsilyl protecting groups. Additional methods of deprotection of the tert-butyldimethylsilyl protecting groups can be found in T. W. Greene and P. G. M. Wuts, Protective Groups in Organic Synthesis, Second Edition, Wiley, New York, 1991, pages 80-83.

One suitable method of preparing the pentablock comprising the steps of a) anionically polymerizing, with a functional initiator, the B block monomer (such as styrene), b) polymerizing the C block monomer, (such as isoprene), c) coupling the block copolymer formed in steps a) and b) with a coupling agent, deprotecting, and further polymerizing the coupled polymer of step c) with a ring-opening polymerizable monomer (such as ethylene oxide).

In this method the ends of the RO—BC—Li block copolymer is coupled to generate a RO—CBC—OR block copolymer with a coupling agent such that substantially each polymer chain has a residue of an initiator present on substantially each polymer chain end. The coupling agent is present in a minor proportion of the CBC polymer chain backbone. Suitable coupling agents include, in solution, dihalogenated compounds; diacid chlorides; diacid bromides; dichloro compounds; dibromosilanes and dichlorosilanes, and the di-functional compounds: bis-epoxides, bis-aziridines, bis-isocyanates, bis-anhydrides and diesters. Preferred coupling agents include terephthaloyl chloride, dichlorodimethylsilane, dichlorodiphenylsilane, 1,4-dibromobutene, α,α'-dibromoxylene, and m-bis(phenylethenyl) benzene (PEB).

The method may be illustrated as follows with styrene as the "B" monomer, isoprene as the "C" monomer, and a functional initiator. Styrene is anionically polymerized followed by isoprene to yield an RO—BC—Li block copolymer intermediate having a carbon-centered lithium anion on one terminus and the residue of the functional initiator having a protected functional group on the other terminus. For example, if the functional initiator was t-butyldimethylsilylpropyl lithium (TBDMSPL), the residue is t-butyldimethylsilylpropyl. The intermediate is reacted with a coupling agents, such as α,α'-dibromoxylene, to produce an intermediate having the protected functional group on both termini. This intermediate may be deprotected, such as by reaction with fluoride ion. Using the TBDMSPL initiator, deprotection yields a hydroxyl group at the copolymer termini. This hydroxyl-functional copolymer may be reacted with the A monomer via ring-opening polymerization to provide the A blocks.

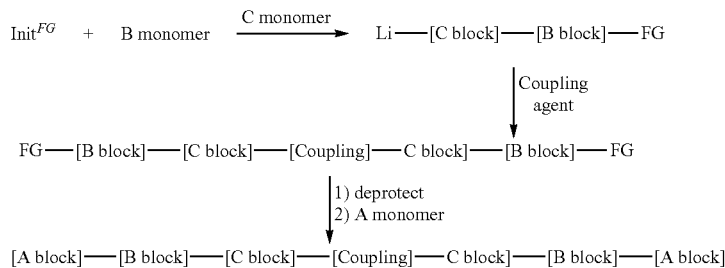

In another embodiment the functional initiator may be reacted with the B monomers, followed by the C monomers to produce the same Li—[C block]-[B block]-FG intermediate supra. This intermediate may then be reacted with a second quantity of B monomers, followed by a quantity of ethylene oxide or other oxirane, to monofunctionalize a terminus of the block copolymer to yield the intermediate shown. Deprotection of the functional group yields a difunctional, telechelic block copolymer, which may be reacted with additional A monomer to yield the pentablock copolymer.

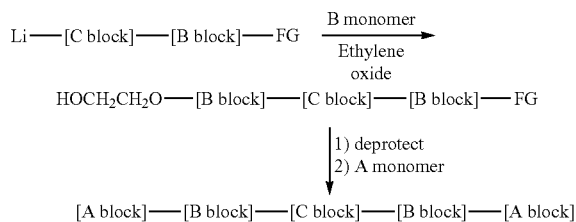

In another embodiment the anionic polymerization can be initiated with a difunctional initiator, with the C monomers, the B monomers and the A monomers.

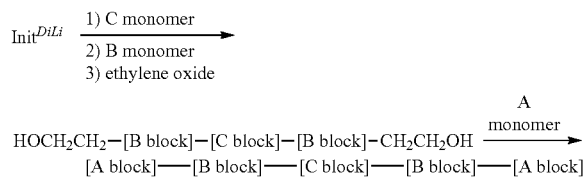

With each of the synthetic schemes it will be understood that some amount of A, B, C, BC, BCB, or ABC (co) polymers will also be present in the isolated (co)polymer blend. Generally greater than 50 wt. % of the resulting blend will be the pentablock copolymer, as determined by GPC and/or NMR.

Further to the ABCBA block copolymer, the porous membrane may also contain at least one additive, such as for instance and without limitation, a homopolymer, a diblock copolymer, a triblock copolymer, and combinations thereof. These additives are not a majority component in the membrane, but are rather present in an amount ranging from 1 weight percent to 49 weight percent of the total weight of the membrane, inclusive.

Each block optionally comprises a weight average molecular weight ranging from 1,000 to 1,000,000 grams per mole, inclusive, such as ranging from 60,000 grams per mole to 200,000 grams per mole, inclusive. In select embodiments, the ABCBA block copolymer comprises a polydispersity ranging from 1.0 to 5.0, 1.0 to 4.0, 1.0 to 3.0, or 1.0 to 2.0, each range being inclusive.

In certain embodiments, porous membranes prepared according to the present disclosure include pores that change in size from one surface, through the thickness of the membrane, to the opposing surface. For instance, often a pore size is on average smallest at one surface, increases throughout the body of the membrane, and is on average largest at the opposite surface. Process conditions and specific solution formulations can be selected to provide a porous membrane in which the pores at one surface (or both major surfaces) of the membrane have an average pore size of 1 nanometer (nm) or greater, 5 nm or greater, 10 nm or greater, 20 nm or greater, 30 nm or greater, or 40 nm or greater; and 500 nm or less, 450 nm or less, 400 nm or less, 350 nm or less, 300 nm or less, 250 nm or less, 200 nm or less, or 150 nm or less. Stated another way, the surface pores (e.g., pores located on at least one membrane surface) may have an average pore size ranging from 1 nm to 500 nm, inclusive, or from 5 nm to 50 nm, inclusive.

In select embodiments, the membrane is isoporous (i.e., having approximately the same pore size). For an isoporous membrane, in some embodiments a standard deviation in pore diameter at a surface of the membrane (e.g., surface pore diameter) is 4 nm or less from a mean pore diameter at the surface of the membrane when the mean pore diameter at the surface of the membrane ranges from 5 to 15 nm, the standard deviation in pore diameter at the surface of the membrane is 6 nm or less from the mean pore diameter at the surface of the membrane when the mean pore diameter at the surface of the membrane ranges from greater than 15 to 25 nm, and the standard deviation in pore diameter at the surface of the membrane is 25% or less of the mean pore diameter at the surface of the membrane when the mean pore diameter at a surface of the membrane ranges from greater than 25 to 50 nm. The mean surface pore diameter is the average diameter of the pores at a surface of the membrane, as opposed to pores within the body of the membrane. Further, an isoporous membrane may have a pore density of $1 \times 10^{14}$ pores per square meter or greater.

In select embodiments the membrane is free-standing, whereas in alternate embodiments the membrane is disposed on a substrate. Suitable substrates include for example and without limitation, polymeric membranes, nonwoven substrates, porous ceramic substrates, and porous metal substrates. Optionally, the membrane comprises a hollow fiber membrane, in which the membrane has a hollow shape. In certain embodiments, the hollow fiber membrane can be disposed on a substrate that has a hollow shape. The membrane may be either symmetric or asymmetric, for instance depending on a desired application. The porous membrane typically has a thickness ranging from 5 micrometers to 500 micrometers, inclusive.

Advantageously, porous membranes according to at least some embodiments of the present disclosure provide good toughness properties. Having a minimum toughness allows the membrane to be handled and used in various applications without becoming damaged. For example, in certain embodiments, the membrane exhibits a toughness of 30 kJ/m$^3$ or greater as a free-standing film when dry, as measured by integrating the area under a stress-strain curve for the membrane. Measuring the toughness is described further in the Examples section below.

As noted above, a method of making a porous membrane is provided, and comprises: forming a film or a hollow fiber from a solution, the solution comprising a solvent and solids comprising an ABCBA block copolymer; removing at least a portion of the solvent from the film or the hollow fiber; and contacting the film or the hollow fiber with a nonsolvent, thereby forming the porous membrane comprising a plurality of pores. SIPS methods of forming porous membranes have been known, such as described in U.S. Pat. No. 3,133,132 (Loeb et al.) and U.S. Pat. No. 3,283,042 (Loeb et al.).

For example, in certain embodiments forming the film comprises casting the solution on a substrate, whereas in other embodiments forming the hollow fiber comprises spinning the solution into the hollow fiber.

The amount of solvent present is not particularly limited, and may include 65 weight percent (wt. %) solvent or greater, 70 wt. % solvent or greater, or 70 wt. % solvent or greater; and 95 wt. % solvent or less, 90 wt. % solvent or less, or 85 wt. % solvent or less. The weight percent of solvent is based on the total weight of the solution. Stated another way, the solvent may be present in an amount ranging from 65 to 95 wt. % of the total solution, inclusive, 65 to 80 wt. % of the total solution, inclusive, or 85 to 95 wt. % of the total solution, inclusive. Some exemplary solvents for use in the method include dimethylformamide, dimethylacetamide, N-methylpyrrolidone, dimethylsulfoxide, tetrahydrofuran, 1,4-dioxane, 1,3-dioxane, tetrahydrothiophene 1,1-dioxide, methyl ethyl ketone, methyl tetrahydrofuran, sulfolane, and combinations thereof. In an embodiment, the solvent is a blend of dimethylformamide and tetrahydrofuran, for instance including 40 weight percent dimethylformamide and 60 weight percent tetrahydrofuran.

In certain embodiments, methyl ethyl ketone (MEK) is used as a casting cosolvent for formation of macroporous structures and isoporous thin composite membranes (e.g., as described in the examples below). It is not believed that MEK has previously been reported as a casting cosolvent in the block copolymer membranes SIPS process. For example, in patent application DE102012207344 for producing ultrafiltration membranes from amphiphilic block copolymers, the solvents claimed are "preferably tetrahydrofuran and/or dimethylformamide and/or acetonitrile and/or water and/or dioxane and/or dimethylacetamide and/or N-methylpyrrolidone and/or dimethyl sulfoxide". Further, in U.S. Pat. No. 9,592,477 describing membranes comprising self-assembled block copolymers, solvent systems are claimed which include "a solvent or a mixture of solvents selected from dichloromethane, 1-chloropentane, chloroform, 1,1-dichloroethane, N,N-dimethylformamide, N,N-dimethylacetamide, N-methylpyrrolidone, dimethylsulfoxide, tetrahydrofuran, 1,3-dioxane, and 1,4-dioxane". Moreover, the consideration of MEK for use as a casting solvent is unexpected due to it only being partially soluble in water (27.5 g in 100 mL), which is typically used as the nonsolvent. For example, a 2015 review of nanoporous membranes generated from self-assembled block polymer precursors stated that " . . . the selection of the solution to be used as the nonsolvent quenching bath is important to the membrane fabrication process. The liquid used must be miscible with the solvent . . . ." (J. Appl. Polym. Sci. 2015, DOI: 10.1002/APP.41683).

Typically, removing at least a portion of the solvent from the cast solution comprises evaporating at least a portion of the solvent from the cast solution for a time of 1 millisecond or greater, 50 milliseconds or greater, 500 milliseconds or greater, 1 second or greater, 5 seconds or greater, 10 seconds or greater, or 20 seconds or greater; and 120 seconds or less, 100 seconds or less, 80 seconds or less, 60 seconds or less, 40 seconds or less, or 30 seconds or less. Stated another way, removing at least a portion of the solvent from the cast solution can comprise evaporating at least a portion of the solvent from the cast solution for a time of ranging from 1 millisecond to 120 seconds, inclusive, 1 millisecond to 30 seconds, 20 seconds to 60 seconds, or 40 seconds to 120 seconds, inclusive.

The skilled practitioner is familiar with nonsolvents; in certain embodiments of the method, the nonsolvent comprises water.

Optionally, the solids further comprise at least one additive. For example, such additives may comprise for instance and without limitation, one or more of a homopolymer, a diblock polymer, or triblock polymer in an amount ranging from 1 to 49 wt. % of the total solids, inclusive.

In certain embodiments, the solids make up less than a majority of the total solution. For instance, the solids are usually included in an amount of 5 wt. % or greater, 10 wt. % or greater, 15 wt. % or greater, or 20 wt. % or greater; and 35 wt. % or less, 30 wt. % or less, or 25 wt. % or less. Stated another way, the solids may be present in an amount ranging from 5 to 35 wt. %, or from 10 to 30 wt. % of the total solution, inclusive.

EMBODIMENTS

Embodiment 1 is a porous membrane comprising an ABCBA block copolymer and the membrane includes a plurality of pores. The A block is immiscible with each of the B block and the C block; the B block has a $T_g$ of 90 degrees Celsius or greater and is present in an amount ranging from 30% to 80% by weight, inclusive, of the total block copolymer; and the C block has a $T_g$ of 25 degrees Celsius or less and is present in an amount ranging from 10% to 40% by weight, inclusive, of the total block copolymer.

Embodiment 2 is the porous membrane of embodiment 1, wherein the pores at a surface of the membrane comprise an average pore size ranging from 1 nanometer (nm) to 500 nm, inclusive.

Embodiment 3 is the porous membrane of embodiment 1 or embodiment 2, wherein the pores at a surface of the membrane comprise an average pore size ranging from 5 nm to 50 nm, inclusive.

Embodiment 4 is the porous membrane of any of embodiments 1 to 3, wherein the membrane is isoporous.

Embodiment 5 is the porous membrane of embodiment 4, wherein a standard deviation in pore diameter at a surface of the membrane is 4 nm or less from a mean pore diameter at the surface of the membrane when the mean pore diameter at the surface of the membrane ranges from 5 to 15 nm, the standard deviation in pore diameter at the surface of the membrane is 6 nm or less from the mean pore diameter at the surface of the membrane when the mean pore diameter at the surface of the membrane ranges from greater than 15 to 25 nm, and the standard deviation in pore diameter at the surface of the membrane is 25% or less of the mean pore diameter at the surface of the membrane when the mean pore diameter at the surface of the membrane ranges from greater than 25 to 50 nm.

Embodiment 6 is the porous membrane of embodiment 4 or embodiment 5, wherein the membrane comprises a pore density of $1 \times 10^{14}$ pores per square meter or greater.

Embodiment 7 is the porous membrane of any of embodiments 1 to 6, wherein the membrane is asymmetric.

Embodiment 8 is the porous membrane of any of embodiments 1 to 7, wherein the A block comprises a poly(alkylene oxide), a substituted epoxide, a polylactam, or a substituted carbonate.

Embodiment 9 is the porous membrane of any of embodiments 1 to 7, wherein the A block is selected from the group consisting of poly(D-lactide), poly(L-lactide), poly(D/L-lactide), polyethyleneoxide, poly(propylene oxide), poly(ethyoxyethylglycidylether), poly(4-vinylpyridine), poly(2-vinylpyridine), polyhydroxystyrene, polyacrylamide, polyacrylic acid, poly(methacrylic acid), polydimethylacrylamide, poly(N-isopropylacrylamide), polyhydroxyethylmethacrylate, poly-ε-caprolactone, and poly(propylenecarbonate).

Embodiment 10 is the porous membrane of any of embodiments 1 to 9, wherein the B block comprises a polyalkylmethacrylate.

Embodiment 11 is the porous membrane of any of embodiments 1 to 9, wherein the B block is selected from the group consisting of styrene, p-methylstyrene, alpha-methylstyrene, poly(tert-butylstyrene), and polymethylmethacrylate.

Embodiment 12 is the porous membrane of any of embodiments 1 to 11, wherein the C block comprises a polyacrylate or a polysiloxane.

Embodiment 13 is the porous membrane of any of embodiments 1 to 11, wherein the C block is selected from the group consisting of polyisoprene, polybutadiene, polyisobutylene, polydimethylsiloxane, polyethylene, poly(ethylene-alt-propylene), poly(ethylene-co-butylene-co-propylene), polybutylene, and poly(ethylene-stat-butylene).

Embodiment 14 is the porous membrane of any of embodiments 1 to 13, further comprising at least one additive selected from the group consisting of a homopolymer, a diblock copolymer, a triblock copolymer, and combinations thereof, in an amount ranging from 1 weight percent to 49 weight percent, inclusive.

Embodiment 15 is the porous membrane of any of embodiments 1 to 14, wherein the membrane is free-standing.

Embodiment 16 is the porous membrane of any of embodiments 1 to 14, wherein the membrane is disposed on a substrate.

Embodiment 17 is the porous membrane of any of embodiments 1 to 16, wherein the membrane comprises a hollow fiber membrane.

Embodiment 18 is the porous membrane of any of embodiments 1 to 17, wherein the membrane has a thickness ranging from 5 micrometers to 500 micrometers, inclusive.

Embodiment 19 is the porous membrane of any of embodiments 1 to 18, wherein the ABCBA block copolymer comprises a polydispersity ranging from 1.0 to 5.0, inclusive, or from 1.0 to 2.0, inclusive.

Embodiment 20 is the porous membrane of any of embodiments 1 to 19, wherein each block comprises a weight average molecular weight ranging from 1,000 to 1,000,000 grams per mole, inclusive, or 60,000 to 200,000 grams per mole, inclusive.

Embodiment 21 is the porous membrane of any of embodiments 1 to 20, wherein the membrane exhibits a toughness of 30 kJ/m$^3$ or greater as a free-standing film when dry, as measured by integrating the area under a stress-strain curve for the membrane.

Embodiment 22 is a method of making a porous membrane. The method comprises forming a film or a hollow fiber from a solution; removing at least a portion of the solvent from the film or the hollow fiber; and contacting the film or the hollow fiber with a nonsolvent, thereby forming the porous membrane comprising a plurality of pores. The solution comprises a solvent and solids comprising an ABCBA block copolymer.

Embodiment 23 is the method of embodiment 22, wherein the solids are present in an amount ranging from 5 to 35 weight percent of the total solution, inclusive.

Embodiment 24 is the method of embodiment 22 or 23, wherein the solids are present in an amount ranging from 10 to 30 weight percent of the total solution, inclusive.

Embodiment 25 is the method of any of embodiments 22 to 24, wherein the solvent is present in an amount ranging from 65 to 95 weight percent of the total solution, inclusive.

Embodiment 26 is the method of any of embodiments 22 to 25, wherein the solvent is selected from the group consisting of dimethylformamide, dimethylacetamide, N-methylpyrrolidone, dime thylsulfoxide, tetrahydrofuran, 1,4-dioxane, 1,3-dioxane, tetrahydrothiophene 1,1-dioxide, methyl ethyl ketone, methyl tetrahydrofuran, sulfolane, and combinations thereof.

Embodiment 27 is the method of any of embodiments 22 to 26, wherein the solvent is a blend of dimethylformamide and tetrahydrofuran.

Embodiment 28 is the method of embodiment 27, wherein the solvent is 40 weight percent dimethylformamide and 60 weight percent tetrahydrofuran.

Embodiment 29 is the method of any of embodiments 22 to 28, wherein forming the film comprises casting the solution on a substrate.

Embodiment 30 is the method of any of embodiments 22 to 28, wherein forming the hollow fiber comprises spinning the solution into the hollow fiber.

Embodiment 31 is the method of any of embodiments 22 to 30, wherein removing at least a portion of the solvent from the cast solution comprises evaporating at least a portion of the solvent from the cast solution for a time ranging from 1 millisecond to 120 seconds, inclusive.

Embodiment 32 is the method of any of embodiments 22 to 31, wherein the solids further comprise one or more of a homopolymer, a diblock polymer, or triblock polymer in an amount ranging from 1 to 49 weight percent of the total solids, inclusive.

Embodiment 33 is the method of any of embodiments 22 to 32, wherein the nonsolvent comprises water.

Embodiment 34 is the method of any of embodiments 22 to 33, wherein the pores at a surface of the membrane comprise an average pore size ranging from 1 nanometer (nm) to 500 nm, inclusive.

Embodiment 35 is the method of any of embodiments 22 to 34, wherein the pores at a surface of the membrane comprise an average pore size ranging from 5 nm to 50 nm, inclusive.

Embodiment 36 is the method of any of embodiments 22 to 35, wherein the membrane is isoporous.

Embodiment 37 is the method of embodiment 36 wherein a standard deviation in pore diameter at a surface of the membrane is 4 nm or less from a mean pore diameter at the surface of the membrane when the mean pore diameter at the surface of the membrane ranges from 5 to 15 nm, the standard deviation in pore diameter at the surface of the membrane is 6 nm or less from the mean pore diameter at the surface of the membrane when the mean pore diameter at the surface of the membrane ranges from greater than 15 to 25 nm, and the standard deviation in pore diameter at the surface of the membrane is 25% or less of the mean pore diameter at the surface of the membrane when the mean surface pore diameter ranges from greater than 25 to 50 nm.

Embodiment 38 is the method of embodiment 36 or embodiment 37, wherein the membrane comprises a pore density of $1 \times 10^{14}$ pores per square meter or greater.

Embodiment 39 is the method of any of embodiments 22 to 38, wherein the membrane is asymmetric.

Embodiment 40 is the method of any of embodiments 22 to 39, wherein the A block comprises a poly(alkylene oxide), a substituted epoxide, a polylactam, or a substituted carbonate.

Embodiment 41 is the method of any of embodiments 22 to 39, wherein the A block is selected from the group consisting of poly(D-lactide), poly(L-lactide), poly(D/L-lactide), polyethyleneoxide, poly(propylene oxide), poly(ethyoxyethylglycidylether), poly(4-vinylpyridine), poly(2-vinylpyridine), polyhydroxystyrene, polyacrylamide, polyacrylic acid, poly(methacrylic acid), polydimethylacrylamide, poly(N-isopropylacrylamide), polyhydroxyethylmethacrylate, poly-ε-caprolactone, and poly(propylenecarbonate).

Embodiment 42 is the method of any of embodiments 22 to 41, wherein the B block comprises a polyalkylmethacrylate.

Embodiment 43 is the method of any of embodiments 22 to 41, wherein the B block is selected from the group consisting of styrene, p-methylstyrene, alpha-methylstyrene, poly(tert-butylstyrene), and polymethylmethacrylate.

Embodiment 44 is the method of any of embodiments 22 to 43, wherein the C block comprises a polyacrylate or a polysiloxane.

Embodiment 45 is the method of any of embodiments 22 to 43, wherein the C block is selected from the group consisting of polyisoprene, polybutadiene, polyisobutylene, polydimethylsiloxane, polyethylene, poly(ethylene-alt-propylene), poly(ethylene-co-butylene-co-propylene), polybutylene, and poly(ethylene-stat-butylene).

Embodiment 46 is the method of any of embodiments 22 to 45, wherein the membrane is free-standing.

Embodiment 47 is the method of any of embodiments 22 to 45, wherein the membrane is disposed on a substrate.

Embodiment 48 is the method of any of embodiments 22 to 47, wherein the membrane comprises a hollow fiber membrane.

Embodiment 49 is the method of any of embodiments 22 to 48, wherein the membrane has a thickness ranging from 5 micrometers to 500 micrometers, inclusive.

Embodiment 50 is the method of any of embodiments 22 to 49, wherein the ABCBA block copolymer comprises a polydispersity ranging from 1.0 to 5.0, inclusive, or from 1.0 to 2.0, inclusive.

Embodiment 51 is the method of any of embodiments 22 to 50, wherein each block comprises a weight average molecular weight ranging from 1,000 to 1,000,000 grams per mole, inclusive, or 60,000 to 200,000 grams per mole, inclusive.

Embodiment 52 is the method of any of embodiments 22 to 51, wherein the membrane exhibits a toughness of 30 kJ/m$^3$ or greater as a free-standing film when dry, as measured by integrating the area under a stress-strain curve for the membrane.

EXAMPLES

TABLE 1

| | Materials | |
|---|---|---|
| Abbreviation or Trade Name | CAS #/Product Code | Description |
| Isoprene | L14619 | Available from Alfa Aesar, Ward Hill, Massachusetts. |
| Styrene | S4972 | Reagent plus, >99%, available from Sigma-Aldrich Co. LLC., St. Louis, Missouri |
| TBDMSPL | — | Tert-butyl-dimethylsiloxy-propyl-1-lithium, 1.04M in cyclohexane, available from FMC lithium. |
| Rac-lactide | M700 | Monomer available from NatureWorks LLC, Minnetonka, Minnesota. |
| Benzene | BX0212-6 | Omnisolve, available from EMD Millipore |
| Methylene Chloride | DX0831-1 | Omnisolve, available from EMD Millipore |
| DBU | A12449 | 1,8-Diazabicyclo[5.4.0]undec-7-ene, 99%, available from Alfa Aesar, Ward Hill, Massachusetts. |
| TBAF | 216143 | Tetrabutylammonium Fluoride, 1.0M in THF, available from Sigma-Aldrich Co. LLC., St. Louis, Missouri. |
| Dibromoxylene | D44804 | α,α'-1,4-dibromoxylene, available from Sigma-Aldrich Co. LLC., St. Louis, Missouri |
| DI Water | | Deionized water |
| MilliQ Water | | Water from a MilliQ Gradient A10 system (EMD Millipore) |
| Isopropanol (IPA) | 67-63-0 | BDH, London, UK |
| Tetrahydrofuran (THF) | 109-99-9 | OmniSolv, EMD Millipore Corporation, Billerica MA |
| N,N-Dimethyl formamide (DMF) | 68-12-2 | Sigma-Aldrich, Milwaukee, WI |
| 1,4-dioxane | 290-67-5 | Sigma-Aldrich, Milwaukee, WI |
| IS4V | — | Prepared according to Macromolecules, Vol. 25, No. 20 (1992), p. 5408, Mogi et al. |

TABLE 1-continued

Materials

| Abbreviation or Trade Name | CAS #/Product Code | Description |
|---|---|---|
| 6 kDa dextran | 9004-54-0 | Sigma-Aldrich Co. LLC., St. Louis, Missouri |
| 40 kDa dextran | 9004-54-0 | Sigma-Aldrich Co. LLC., St. Louis, Missouri |
| 100 kDa dextran | 9004-54-0 | Sigma-Aldrich Co. LLC., St. Louis, Missouri |
| 500 kDa dextran | 9004-54-0 | Sigma-Aldrich Co. LLC., St. Louis, Missouri |
| 2000 kDa dextran | 9004-54-0 | Sigma-Aldrich Co. LLC., St. Louis, Missouri |
| Dimethyl acetamide (DMAc) | 127-19-5 | Alfa Aesar, Haverhill, MA |
| Methyl tetrahydrofuran (MeTHF) | 96-47-9 | Alfa Aesar, Haverhill, MA |
| Sulfolane | 126-33-0 | Alfa Aesar, Haverhill, MA |
| Ethylene Oxide | 75-21-8 | Ethylene Oxide >= 99.5%. Available from Sigma Aldrich Co. LLC., St. Louis, Missouri, Product Code 387614 |
| Propylene Oxide (PPO) | 75-56-9 | 99%, Available from Sigma Aldrich Co. LLC., St. Louis, Missouri, Product Code 110205 |
| Methanol | 67-56-1 | Omnisolv, available from EMD Millipore, Product Code MX0480-6 |
| Potassium | 7440-09-7 | Potassium, cubes (in mineral oil), L × W × H 40 mm × 30 mm × 20 mm, 99.5% trace metals basis. Available from Sigma Aldrich Co. LLC., St. Louis, Missouri, Product Code 679909 |
| Naphthalene | 91-20-3 | Naphthalene, 99.6%. Available from Alpha Aesar, Ward Hill, Massachusetts, Product Code 33347 |
| Diphenylethylene | 530-48-3 | 1,1-Diphenylethylene, 98%. Available from Alfa Aesar, Ward Hill, Massachusetts, Product Code A14434 |
| Tri-iso-butylaluminum | 100-99-2 | 1.0M in hexanes, available from Sigma Aldrich Co. LLC., St. Louis, Missouri, Product Code 423793 |
| P4 Base | 111324-04-0 | 1-tert-Butyl-4,4,4-tris(dimethylamino)-2,2-bis[tris(dimethylamino)-phosphoranylidenamino]-$2\lambda^5,4\lambda^5$-catenadi(phosphazene), Phosphazene base, 0.8M in hexanes. Available from Sigma Aldrich Co. LLC., St. Louis, Missouri, Product Code 79421 |
| Toluene | 108-88-3 | Toluene, anhydrous, 99.8% Available from Sigma Aldrich Co. LLC., St. Louis, Missouri, Product Code 244511 |
| Hydrochloric Acid | 7647-01-0 | 1N aqueous solution, available from J. T. Baker. Product Code 5620-02 |
| n-butyllithium | 109-72-8 | 24 wt % n-butyllithium in hexanes, available from FMC Lithium, Product Code 703-02 |

Polymer Synthesis General Considerations:

Polymer synthesis and reagent purifications were conducted in a MBraun Labmaster SP glovebox or in custom glassware designed to enable anionic polymerizations (for examples see Ndoni, S.; Papadakis, C. M.; Bates, F. S.; Almdal, K. Laboratory-scale Setup for Anionic Polymerization under Inert Atmosphere. *Review of Scientific Instruments* 1995, 66 (2), 1090-1095 DOI: 10.1063/1.1146052). Standard air-free techniques were used for anionic polymerization and reagent manipulations. Reagents and corresponding suppliers are listed above in Table 1.

Reagent Drying

Benzene was degassed by bubbling with Ar for longer than one hour before being cannula-transferred to a Strauss flask containing degassed 1,1-diphenylethylene. Sec-BuLi was then added under Ar counterflow via syringe, causing a very gradual color change from light yellow to deep, wine red over the course of an hour. After stirring overnight, benzene was vacuum transferred to an addition funnel. $CH_2Cl_2$ was dried over $CaH_2$, degassed, and vacuum-transferred into a receiving flask. Styrene was stirred over $CaH_2$ overnight and then vacuum-transferred into a Schlenk bomb containing dried dibutyl-magnesium. After stirring overnight in an Ar atmosphere, styrene was again vacuum-transferred into a receiving flask to afford a final, dry monomer. Isoprene was dried as detailed above for styrene with sequential vacuum transfers from $CaH_2$ and dibutyl-magnesium. Rac-lactide was recrystallized from ethyl acetate and dried overnight under high vacuum. Ethylene oxide was condensed in a receiving flask cooled with liquid nitrogen, degassed by at least three freeze-pump-thaw cycles taking care not to warm the ethylene oxide above its boiling point (10.7° C.), vacuum transferred to a flask containing n-butyllithium (solvent removed in vacuo) and stirred at 0° C. for at least 30 minutes, vacuum transferred to a second flask containing n-butyllithium (solvent removed in vacuo) and stirred at 0° C. for at least an additional 30 minutes, and finally vacuum transferred to a flame dried monomer flask suitable for connection to the polymerization reactor. Propylene oxide was dried as detailed above by degassing and twice stirring over n-butyllithium at 0° C. In some cases, isoprene was also dried as detailed above by degassing and twice stirring over n-butyllithium at 0° C. Tetrahydrofuran and toluene used as solvent for polymerizations were purified via solvent purification system (Pure Process Technology LLC Nashua N.H. 03064). All other chemicals were used as received.

Gel Permeation Chromatography (GPC)

Tetrahydrofuran (THF, stabilized with 250 ppm BHT) was used as a solvent and the mobile phase. Solutions of known concentration were prepared in glass scintillation vials; the target concentration was ≈2.5 mg/mL. The vials were swirled for at least 4 hours in order to allow dissolution. The solutions were then filtered using 0.2 μm polytetrafluoroethylene (PTFE) syringe filters. The GPC conditions were as follows:

TABLE 2

GPC conditions

| Instrument: | Agilent 1260 LC |
|---|---|
| Column set: | Agilent Plgel MIXED A, 300 × 7.5 mm I.D. |
| | Agilent Plgel MIXED B, 300 × 7.5 mm I.D |
| Col. Heater: | 40° C. |
| Mobile phase: | THF, stabilized with 250 ppm BHT at 1.0 mL/min |
| Injection volume: | 40 μL |
| Detectors: | Wyatt DAWN HELEOS-II 18 angle Light Scattering detector |
| | Wyatt ViscoStar II viscometer detector |
| | Wyatt Optilab rEX Differential Refractive Index (DRI) detector |

ASTRA 6 software from Wyatt Technology Corporation (Santa Barbara, Calif.) was used for data collection and analysis. A narrow standard of polystyrene of ≈30 kg/mol was used for normalization of the light scattering detectors and for measuring the inter-detector volume.

Preparatory Example 1: Preparation of Hydroxyl-Terminated Poly(Isoprene-Block-Styrene) (PI-PS-OH)

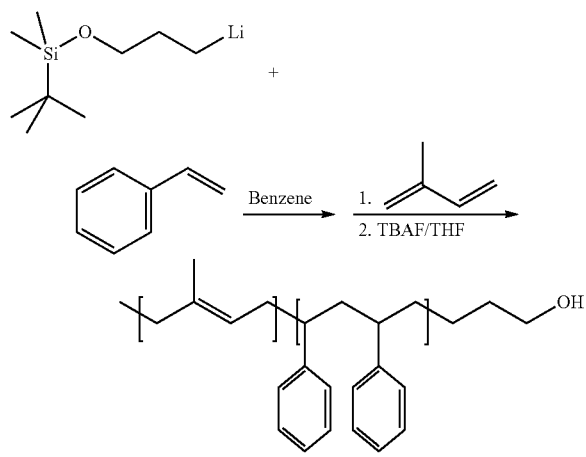

In a glovebox, benzene (600 mL) and styrene (41.45 g) were added to a 1 L Schlenk flask with a stir bar. Under vigorous stirring, TBDMSPL (0.70 mL) was rapidly injected with a syringe. The color of the reaction slowly changed color from colorless to orange over the course of 15 minutes. The polymerization composition was allowed to stir at room temperature in the glovebox for 48 hours. After 48 hours, isoprene (22.55 g) was added, causing a rapid color change from orange to pale yellow. The polymerization composition was stirred for an additional 24 hours, over which time it became more viscous. The polymerization composition was quenched with degassed isopropanol 24 hours after introduction of isoprene.

Product polymer was then dried under reduced pressure and redissolved in ~400 mL THF. Once dissolved, terminal hydroxyl groups were deprotected with 10 mL TBAF in THF (1.0 M) by stirring overnight a room temperature under a nitrogen blanket (bubbler). The next morning, 8 mL acetic acid was added to ensure protonation of the hydroxyl groups. Thirty minutes later, polymer was isolated by filtration through silica gel followed by precipitation from cold methanol.

Polymer was once again dried, dissolved, and precipitated for a total of 2 precipitations to afford a white, dense solid designated PE-1A in Table 3. Polymer corresponding to the other entry in Table 3 was prepared by the same general procedure described above with different proportions of reagents used to achieve the different composition and molecular weight.

Polymer composition was determined by $^1$H-NMR, polymer molecular weight and dispersity by GPC analysis.

TABLE 3

Preparatory Example 1 polymer compositions.

| Sample ID | Mass % Isoprene | Mass % Styrene | GPC Mw (g/mol) | GPC PDI |
|---|---|---|---|---|
| PE-1A | 33.0 | 67.0 | 105000 | 1.05 |
| PE-1B | 45.0 | 55.0 | 67400 | 1.02 |

Preparatory Example 2: Preparation of Hydroxyl-Terminated Poly(Styrene-Isoprene-Styrene) Block Copolymer (HO—SIS—OH) Using a Coupling Agent In a glovebox, benzene (~550 mL) and styrene (33.32 g, 320 mmol) were added to a 1 L Schlenk flask with a stir bar. Under vigorous stirring, TBDMSPL (0.70 mL, 0.70 mmol) was rapidly injected with a syringe. The color of the reaction slowly changed color from colorless to orange over the course of 15 minutes. The polymerization composition was allowed to stir at room temperature in the glovebox for 48 hours. Isoprene (22.48 g, 330 mmol) was then added, causing a rapid color change from orange to pale yellow. The polymerization was stirred for an additional 24 hours over which time it became more viscous. Dibromoxylene (95 mg, 0.36 mmol) was dissolved in ~6 mL dry benzene. Twenty-four hours after addition of isoprene, dibromoxylene solution was added in 100 uL aliquots over the course of 15 minutes. The color of the composition gradually disappeared. The polymerization composition was stirred for 4 more hours before being fully quenched with degassed isopropanol.

Polymer was then dried under reduced pressure and redissolved in THF, TBAF (5.0 mL, 5 mmol) was then added and the polymer solution was stirred overnight. The next morning, 8 mL acetic acid was added to ensure protonation of the hydroxyl groups. Thirty minutes later, polymer was isolated by filtration through silica gel followed by precipitation from cold methanol. Polymer was once again dried, dissolved, and precipitated for a total of 2 precipitations to afford a white solid designated PE-2A in Table 4. Polymers corresponding to other entries in Table 4 were prepared by the same general procedure described above with different proportions of reagents used to achieve different compositions and molecular weights.

Polymer composition was determined by $^1$H-NMR, polymer molecular weight and dispersity by GPC analysis.

TABLE 4

Preparatory Example 2 polymer compositions.

| Sample ID | Mass % Isoprene | Mass % Styrene | GPC Mw (g/mol) | GPC PDI |
|---|---|---|---|---|
| PE-2A | 35.4 | 64.6 | 100000 | 1.04 |
| PE-2B | 39.6 | 60.3 | 127000 | 1.25 |
| PE-2C | 38.4 | 61.6 | 190000 | 1.55 |

Preparatory Example 3: Preparation of Poly(Isoprene-Styrene-D,L-Lactide) Block Copolymer (PI-PS-PLA)

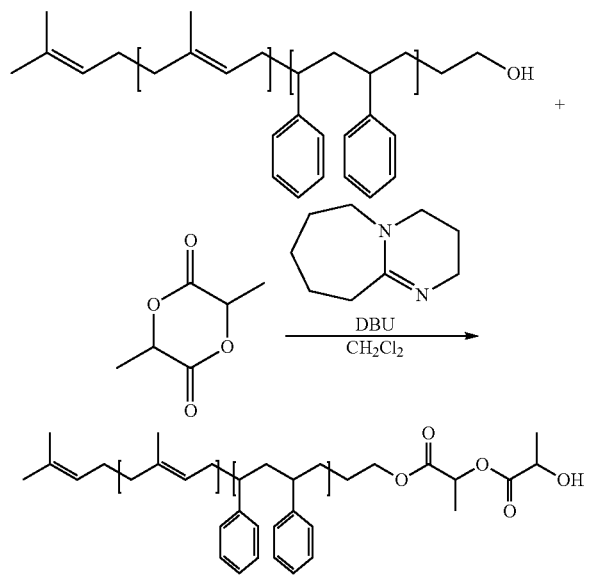

PE-1A (8.15 g, 0.074 mmol —OH), rac-lactide (3.00 g, 20.8 mmol), and $CH_2Cl_2$ (55 mL) were added to a Schlenk bomb equipped with a stir bar. The contents were stirred until completely dissolved (~2 hours). Once dissolved, DBU (163 μL, 0.0011 mmol) was quickly added in conjunction with rapid agitation. The reaction was sealed, brought out of the glovebox, and placed on a stir plate. Over the course of 20 minutes, the viscosity reaction visibly increased. After 1 hour of reaction time, several large flakes of benzoic acid were introduced (no Ar counter flow was necessary). The polymer solution was transferred to a round-bottom flask and solvent was removed on a rotovap. The remaining solid was redissolved in minimal THF and the polymer precipitated from room temperature methanol. Precipitation was repeated from THF/methanol and a white solid designated PE-3A in Table 5 was obtained. The polymer was dried overnight in a vacuum oven set at 60° C. Polymer corresponding to the other entry in Table 5 was prepared by the same general procedure described above with different proportions of reagents used to achieve the different composition and molecular weight.

Polymer composition was determined by $^1$H-NMR, polymer molecular weight and dispersity by GPC analysis.

TABLE 5

Preparatory Example 3 polymer compositions.

| Sample ID | Starting Polymer | Mass % Isoprene | Mass % Styrene | Mass % Lactide | GPC Mw (g/mol) | GPC PDI |
|---|---|---|---|---|---|---|
| PE-3A | PE-1A | 26 | 53.7 | 20.3 | 137000 | 1.08 |
| PE-3B | PE-1B | 28.7 | 48.1 | 23.2 | 79400 | 1.09 |

Preparatory Example 4: Preparation of Poly(Lactide-Styrene-Isoprene-Styrene-Lactide) Block Copolymer (LSISL)

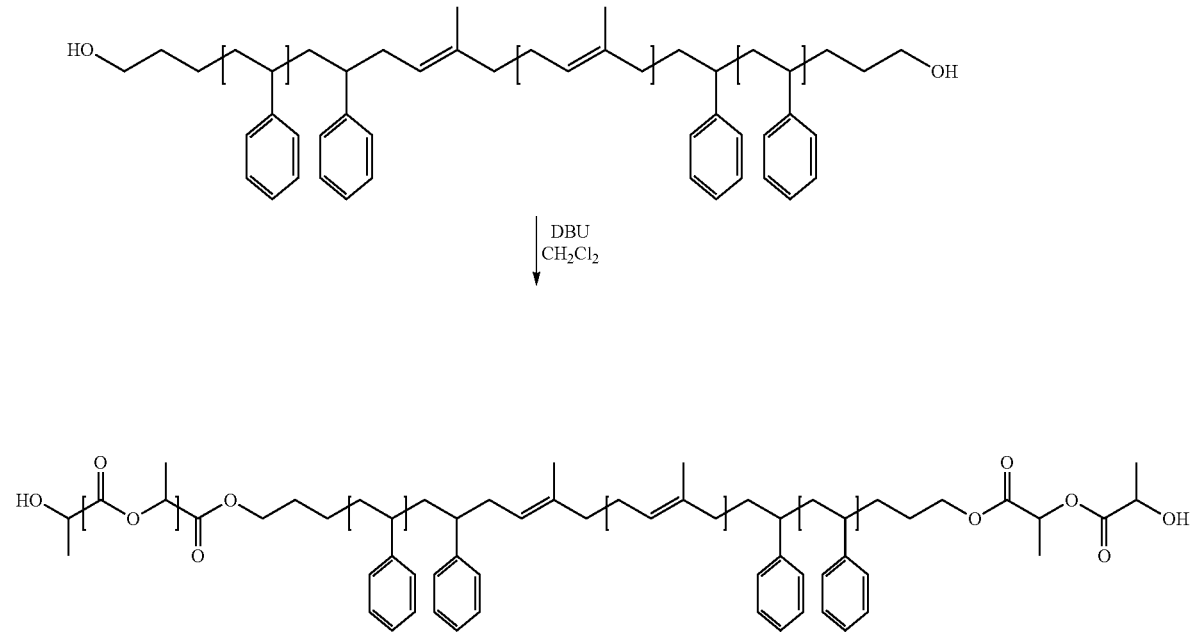

In a glovebox, methylene chloride (48.0 mL), rac-lactide (2.5 g), and HO—SIS—OH polymer (6.75 g, PE-2A) were stirred until completely dissolved (~2 hours). Once dissolved, DBU (45 μL) was quickly added in conjunction with rapid agitation. The reaction was sealed, brought out of the glovebox, and placed on a stir plate. The polymerization remained clear during the course of the reaction. After 1 hour of reaction time, several large flakes of benzoic acid were introduced (no Ar counter flow was necessary). The polymer solution was transferred to a round-bottom flask and solvent was removed on a rotovap. The remaining solid was redissolved in minimal THF and the polymer precipitated from methanol. Precipitation was repeated from THF/methanol and a white solid designated PE-4A in Table 6 was obtained. The polymer was dried overnight in a vacuum oven set at 60° C. Polymers corresponding to other entries in Table 6 were prepared by the same general procedure described above with different proportions of reagents used to achieve different compositions and molecular weights.

Polymer composition was determined by $^1$H-NMR, polymer molecular weight and dispersity by GPC analysis.

TABLE 6

Preparatory Example 4 polymer compositions.

| Sample ID | Starting Polymer Mw (g/mol) | Mass % Isoprene | Mass % Styrene | Mass % Lactide | GPC Mw (g/mol) | GPC PDI |
|---|---|---|---|---|---|---|
| PE-4A | PE-2A | 29.3 | 58.7 | 12.0 | 105000 | 1.25 |
| PE-4B | PE-2A | 28.3 | 56.3 | 15.4 | 107000 | 1.17 |
| PE-4C | PE-2A | 28.2 | 56.5 | 15.3 | 107000 | 1.16 |
| PE-4D | PE-2B | 26.8 | 47.6 | 25.6 | 166000 | 1.36 |
| PE-4E | PE-2C | 27.3 | 50.5 | 22.2 | 279000 | 1.55 |

Preparatory Example 5: Hydroxyl-Terminated Poly(Styrene-Isoprene-Styrene) Block Copolymer (HO—SIS—OH) Using Sequential Addition and Ethylene Oxide Termination

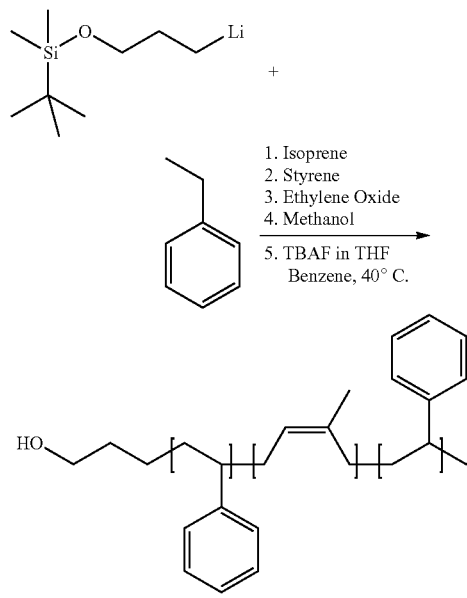

A 2 L polymerization reactor apparatus was constructed and inert Ar atmosphere established. 730 g of purified benzene was added to the reactor. TBDMSPL protected initiator (0.37 mL; nominally 0.37 mmol) was then added to the reactor and stirred for 30 minutes. Purified styrene (15.3 g) was then added to the reactor. After reacting for approximately 2 hours at room temperature, the reactor was heated to 40° C. via a water bath. Approximately 24 hours after the addition of styrene, 12.5 g of isoprene was added to the reactor. Approximately 24 hours after the addition of isoprene, 15.6 g of styrene was added to the reactor. Approximately 24 hours after the second addition of styrene, a large molar excess (3.5 g) of ethylene oxide was added to the reactor. The reactor was then allowed to cool to room temperature. Approximately 16 to 96 hours after the addition of ethylene oxide, the reaction was terminated with degassed methanol to yield a monohydroxyl end functional RO—SIS—OH triblock copolymer.

To yield a dihydroxyl terminal SIS triblock copolymer (HO—SIS—OH), benzene solvent was removed by rotary evaporation and the resulting polymer was dissolved in 400 mL of tetrahydrofuran. A 10× molar excess of TBAF relative to the initiator was added to the THF solution (3.5 mL of 1.0 M TBAF in THF) and the solution was stirred at room temperature for at least 18 hours. The THF solvent was removed by rotary evaporation and the resulting polymer was dissolved in 500 mL of dichloromethane. The methylene chloride solution was washed with several (at least 3) 300 mL aliquots of distilled water. The washed methylene chloride solution was precipitated in cold methanol and the resulting white solid was isolated by filtration and dried in vacuo to yield approximately 40 g of dried polymer designated PE-5A in Table 7. Polymers corresponding to other entries in Table 7 were prepared by the same general procedure as PE-5A with different proportions of reagents used to achieve different compositions and molecular weights.

Polymer composition was determined by $^1$H-NMR, polymer molecular weight and dispersity by GPC analysis.

Table 7. Composition and GPC data for HO—SIS—OH prepared by sequential polymerization of styrene isoprene, and styrene

TABLE 7

Composition and GPC data for HO-SIS-OH prepared by sequential polymerization of styrene, isoprene, and styrene.

| Sample ID | Mass % Isoprene | Mass % Styrene | GPC Mw (kg/mol) | GPC PDI |
|---|---|---|---|---|
| PE-5A | 29.0 | 71.0 | 184 | 1.10 |
| PE-5B | 34.0 | 66.0 | 92 | 1.06 |
| PE-5C | 34.0 | 66.0 | 113 | 1.03 |

Preparatory Example 6: Preparation of Poly(Ethylene Oxide-Styrene-Isoprene-Styrene-Ethylene Oxide) Block Copolymer (OSISO)

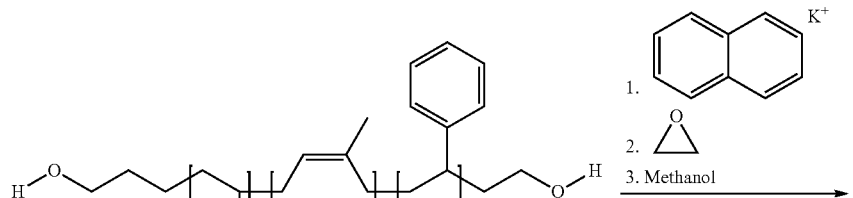

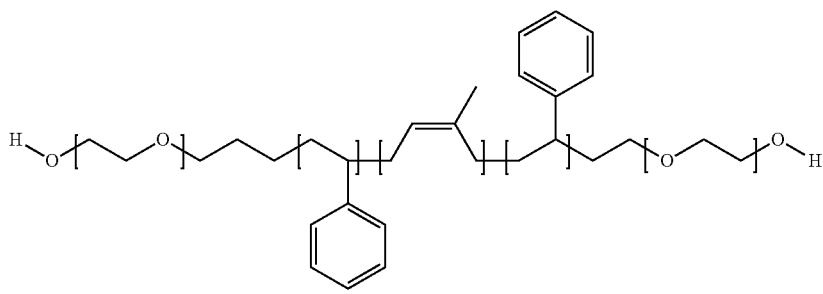

A 1 L polymerization reactor apparatus was constructed and inert Ar atmosphere established. HO—SIS—OH tri-block copolymer (18.7 g, PE-5A) was dissolved in ~100 mL benzene and freeze-dried. Tetrahydrofuran (577 g) was added to the reactor. The reactor was stirred and heated to 45° C. to dissolve the polymer.

Potassium naphthalenide initiator solution was prepared by adding a 10% molar excess of naphthalene and dry tetrahydrofuran solvent to potassium metal. The solution was stirred under an Ar atmosphere for at least 24 hours, resulting in a dark green solution.

Potassium naphthalenide initiator solution was slowly added to the reactor until a pale green color persisted for at least 30 minutes, indicating the endpoint of the titration. Ethylene oxide (4.6 g) was added to the reactor and the reaction was allowed to proceed for approximately 120 hours prior to termination with degassed methanol.

To isolate the solid polymer the tetrahydrofuran solvent was removed by rotary evaporation and the resulting polymer was dissolved in 400 mL of methylene chloride and washed with several (at least 3) 400 mL aliquots of distilled water. The methylene chloride solvent was removed by rotary evaporation and the resulting polymer was redissolved in 150 mL of benzene and freeze dried to yield approximately 18 g of off-white polymer designated PE-6A in Table 8. Polymer corresponding to the other entry in Table 8 was prepared by the same general procedure as PE-6A with different proportions of reagents used to achieve the different composition and molecular weight.

Polymer composition was determined by $^1$H-NMR, and polymer molecular weight and dispersity by GPC analysis.

TABLE 8

Composition and GPC data for OSISO pentablock materials.

| Sample ID | Precursor Polymer | Mass % Isoprene | Mass % Styrene | Mass % Ethylene Oxide | GPC Mw (kg/mol) | GPC PDI |
|---|---|---|---|---|---|---|
| PE-6A | PE-5A | 24.0 | 58.0 | 18.0 | 225 | 1.10 |
| PE-6B | PE-5B | 31.6 | 60.7 | 7.7 | 99 | 1.05 |

Preparatory Example 7: Preparation of Poly(Propyleneoxide-Styrene-Isoprene-Styrene-Propyleneoxide) Block Copolymer (PSISP)

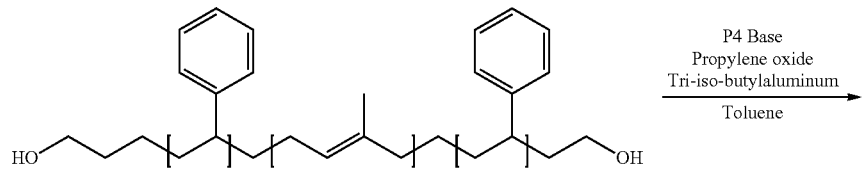

-continued

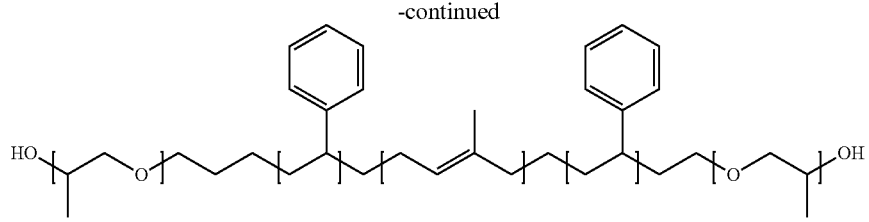

HO—SIS—OH triblock copolymer (15.0 g, PE-5C) was dissolved in ~100 mL benzene in a flask and freeze-dried. In a glovebox, 60 mL toluene was added to the flask and stirred until the polymer completely dissolved. Once dissolved, 511 microliters of P4 phosphazene base solution (0.41 mmol) was added to the reaction flask and stirred for 30 minutes. 8 mL (111 mmol) of propylene oxide and 1.36 mL (1.36 mmol) triisobutyl aluminum solution were then added to the flask and the flask was sealed and allowed to stir at room temperature for 66 hours. The polymerization was terminated with methanol.

To isolate the solid polymer the solvent was removed by rotary evaporation and the resulting polymer was dissolved in 300 mL of methylene chloride and washed with 400 mL of hydrochloric acid solution (diluted to approximately 0.1 wt % in distilled water) followed by several 400 mL aliquots of distilled water. The methylene chloride solvent was removed by rotary evaporation and the resulting polymer was redissolved in 150 mL of benzene and freeze dried to yield a white polymer designated PE-7 in Table 9.

Polymer composition was determined by $^1$H-NMR, polymer molecular weight and dispersity by GPC analysis.

TABLE 9

Composition and GPC data for PSISP pentablock materials.

| Sample ID | Precursor Polymer | Mass % Isoprene | Mass % Styrene | Mass % Propylene oxide | GPC Mw (kg/mol) | GPC PDI |
|---|---|---|---|---|---|---|
| PE-7 | SIS-55 | 48.0 | 25.0 | 27.0 | 137 | 1.06 |

Membrane Casting

Casting LSISL Block Copolymer Membrane Samples

The LSISL block copolymers were dissolved in solvent mixtures at concentrations of 12-21 wt. % to obtain a uniform casting solution. Solvent combinations included 70/30 w/w 1,4-dioxane/THF, mixtures of DMF/THF, and mixtures of dioxane/DMF/THF. A plastic film sheet was used as a temporary support during casting. The coating solutions were cast onto the film using a coating applicator with a gap height of 10 mil (254 micrometers). Following an evaporation period of 10-60 seconds, the coated sheets were introduced into a DI water bath for the coating to undergo phase separation and form a membrane structure.

Imaging

Atomic Force Microscopy (AFM) Imaging

Atomic Force Microscopy (AFM) consists of a flexible cantilever with a sharp tip attached to the cantilever's free end. The sharp AFM tip is brought into contact with a sample and scanned in a raster pattern to generate a three-dimensional image of the sample's surface topography. This imaging technique is based on forces of interaction present between the tip and sample, which cause the cantilever to deflect as it scans across the surface. At each x-y position, the cantilever deflection is measured via a laser beam reflected off the cantilever's backside and detected by a photodiode. The z(x,y) data is used to construct a three-dimensional topography map of the surface. In Tapping Mode AFM, the tip/cantilever assembly is oscillated at the resonant frequency of the cantilever; the amplitude of vertical oscillation is the input parameter for the feedback loop. In a topographic AFM image, "brighter regions" correspond to peaks while "darker regions" correspond to valleys. The phase data is the phase difference between the photodiode output signal and driving excitation signal and is a map of how the phase of the AFM cantilever oscillation is affected by its interaction with the surface. The physical meaning of the phase signal is complex and contrast is generally influenced by material property differences such as composition, adhesion, viscoelasticity and may also include topographical contributions. For imaging in water environment, Peak Force Tapping Mode was used. Unlike the traditional Tapping Mode, Peak Force Tapping Mode operates in a non-resonant mode; the cantilever is driven to oscillation at a fixed frequency (2 kHz modulation in z) and a fast force curve is performed at each pixel of an AFM image. The feedback mechanism in Peak Force Tapping uses the "peak force" setpoint or maximum force sensed by the tip as it contacts the surface. Since there is no need for cantilever tuning, this AFM mode is substantially easier to perform in liquid environment.

AFM imaging was performed using either a Bruker's Dimension ICON AFM or a Bruker's FastScan AFM with a Nanoscope V Controller and Nanoscope 8.15 software. Tapping Mode AFM probes used are FastScan A ($f_0$=1.4 MHz, k=18 N/m, tip radius (nom)=5 nm) and OTESPA R3 ($f_0$=300 kHz, k=26 N/m, tip radius (nom)=7 nm). The tapping setpoint is typically 85% of the free air amplitude. All AFM imaging (with the exception of in-water imaging) were performed under ambient conditions. For in-water imaging, Peak Force Tapping Mode was performed using a FastScan C probe ($f_0$=300 kHz, k=0.8 N/m, tip radius (nom)=5 nm). SPIP 6.5.1 software was used for image processing and analysis. Generally, images were applied with a first order planefit (to remove sample tilt) and with 0th order flatten (to remove z-offsets or horizontal skip artifacts). In some cases, to enhance visualization of features, the images were processed with a 3rd order planefit (removes tilt and bow in image) or applied with an L-filter to remove background waviness.

Scanning Electron Microscopy (SEM) Imaging

The samples for surface images were mounted on conductive carbon tape tabs. The tabs were mounted on an SEM stub and a thin coating of AuPd (20 mA/25 sec) was deposited to make them conductive. Imaging was conducted at 2 kv and 4 mm or 5 mm wd, SE detector and Low Mag Mode, no tilt at 30 kx or 100 kx magnification. The instrument used was a Hitachi SU-8230 field emission scanning electron microscope. Cross-sections of samples for cross-sectional images were made by cutting under LN2 and mounted for examination. A thin coating of Ir (1.8 nm) was deposited to make the samples conductive. Conditions used were 2 kv, 4 mm wd, SEI, no tilt and magnifications employed included: 10k, 30kx, and 70kx using a Hitachi SU-8230 Field Emission Scanning Electron Microscope.

Formation of Membranes from LSISL Copolymers from Dioxane-Containing Solvent Mixtures LSISL block copolymers PE-4A, PE-4B, PE-4C, and PE-4D were dissolved in solvent mixtures of dioxane/THF and dioxane/THF/DMF at concentrations from 10-15 wt. % and cast with evaporation periods from 10-80 seconds at the conditions listed in Table 10. The coatings became opaque and detached from the plastic support sheet while in the bath. Following removal from the water bath and drying, samples were examined by AFM to assess the surface morphology. A few samples (e.g., 4, 11, 21, and 22) showed nanoscale topographical contrast by AFM suggesting a level of surface nanoporosity, but none of them showed ordered nanopores.

TABLE 10

LSISL membrane casting conditions and surface porosity assessment for membranes cast from dioxane-containing solvent mixtures.

| Sample | Polymer | Wt. % | Evaporation Time (s) | Solvent (w/w) | Topography by AFM Suggestive of Nanoporosity |
|---|---|---|---|---|---|
| 1 | PE-4A | 10 | 20 | 70/30 Dioxane/THF | N |
| 2 | | | 40 | | N |
| 3 | | | 60 | | N |
| 4 | | | 80 | | Y |
| 5 | PE-4A | 12 | 10 | 70/30 Dioxane/THF | N |
| 6 | | | 20 | | N |
| 7 | | | 40 | | N |
| 8 | | | 60 | | N |
| 9 | PE-4B | 10 | 20 | 70/30 Dioxane/THF | N |
| 10 | | | 40 | | N |
| 11 | | | 60 | | Y |
| 12 | PE-4B | 12 | 10 | 70/30 Dioxane/THF | N |
| 13 | | | 20 | | N |
| 14 | | | 30 | | N |
| 15 | | | 40 | | N |
| 16 | PE-4D | 10 | 30 | 70/30 Dioxane/THF | N |
| 17 | | | 50 | | N |
| 18 | PE-4C | 10 | 30 | 70/30 Dioxane/THF | N |
| 19 | | | 50 | | N |
| 20 | PE-4D | 12 | 30 | 70/30 Dioxane/THF + trace DMF | N |
| 21 | | | 50 | | Y |
| 22 | PE-4C | 12 | 30 | 70/30 Dioxane/THF + trace DMF | Y |
| 23 | | | 50 | | N |
| 24 | PE-4D | 15 | 20 | 33/33/33 Dioxane/DMF/THF | N |
| 25 | | | 30 | | N |
| 26 | | | 40 | | N |

Figure 1B:
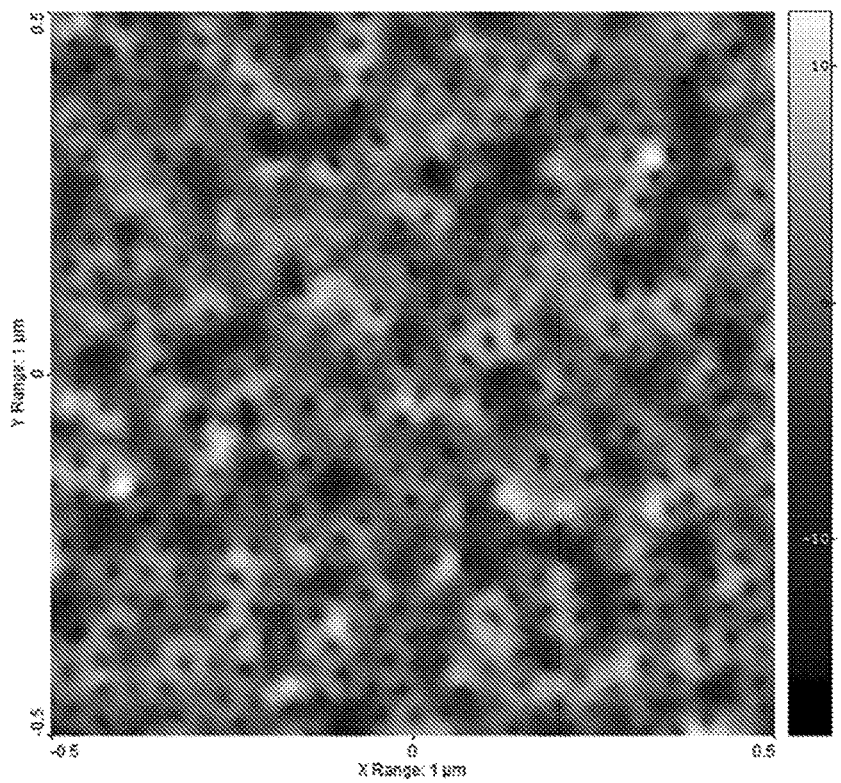
FIG. 1B is an AFM topography image of a surface of another membrane prepared according to an exemplary embodiment of the present disclosure.
Figure 2A:
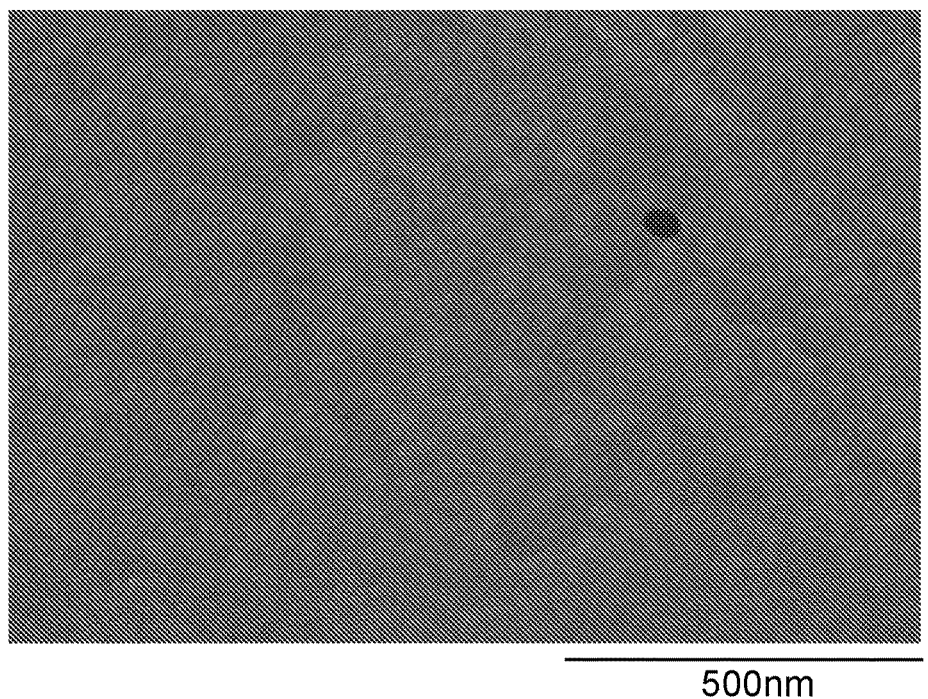
FIG. 2A is a scanning electron microscope (SEM) image of a surface of the membrane of FIG. 1A.
Figure 2B:
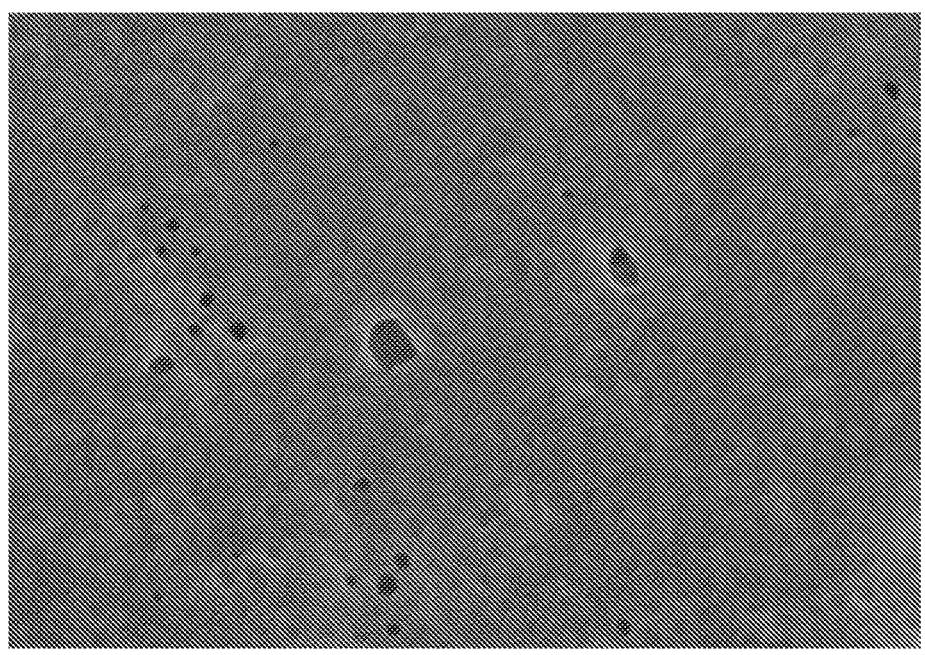
FIG. 2B is an SEM image of a surface of the membrane of FIG. 1B.
Figure 3:
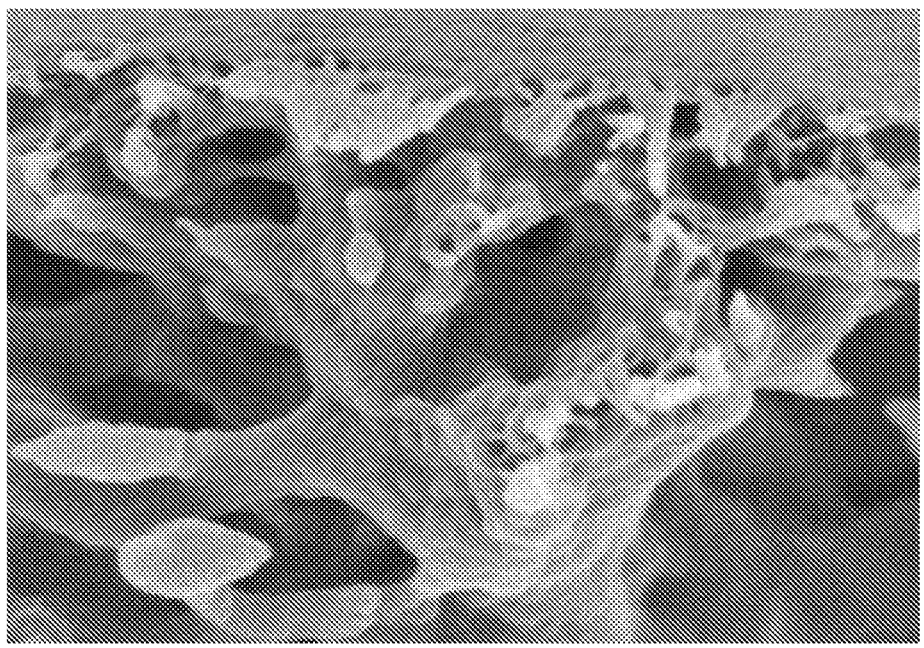
FIG. 3 is an SEM image of a cross-section of the membrane of FIGS. 1B and 2B.

Formation of Membranes from LSISL Copolymers from DMF-Containing Solvent Mixtures with No Dioxane LSISL block copolymers PE-4D and PE-4E were dissolved in solvent mixtures of DMF/THF at concentrations from 12-21 wt. % and cast with evaporation periods from 10-45 seconds at the conditions listed in Table 11. The coatings became opaque and detached from the plastic support sheet while in the bath. Following removal from the water bath and drying, samples were examined by AFM to assess the surface morphology. The majority of these samples showed nanoscale topographical contrast by AFM suggesting a level of surface nanoporosity. The features in a subset of these samples (46, 47, 48, 52, 56) were highly ordered and regular (FIGS. 1A and 1B) as indicated in the final column in Table 11. Further examination of these structures by SEM showed that only a fraction of these features were open pores, while the majority were regular depressions in the topography (FIGS. 2A and 2B). A cross-sectional SEM of a cryofracture sample confirmed that there was a skin layer, with a high level of porosity immediately beneath the sample surface (FIG. 3).

TABLE 11

LSISL membranes casting conditions and surface porosity assessment for membranes cast from DMF-containing solvent mixtures with no dioxane.

| Sample | Polymer | Wt. % | Evaporation Time (s) | Solvent (w/w) | Topography by AFM Suggestive of Nanoporosity | Highly Ordered Features by AFM |
|---|---|---|---|---|---|---|
| 27 | PE-4D | 12 | 20 | 50/50 DMF/THF | Y | N |
| 28 | | | 30 | | Y | N |
| 29 | | | 40 | | Y | N |
| 30 | PE-4D | 15 | 10 | 50/50 DMF/THF | Y | N |
| 31 | | | 20 | | Y | N |
| 32 | | | 30 | | Y | N |
| 33 | PE-4D | 18 | 10 | 50/50 DMF/THF | N | — |
| 34 | | | 15 | | Y | N |
| 35 | | | 20 | | N | — |
| 36 | | | 35 | | Y | N |
| 37 | | | 45 | | Y | N |
| 38 | PE-4D | 15 | 15 | 40/60 DMF/THF | N | — |
| 39 | | | 20 | | N | — |
| 40 | | | 30 | | N | — |
| 41 | | | 40 | | Y | N |
| 42 | PE-4D | 18 | 20 | 40/60 DMF/THF | N | — |
| 43 | | | 30 | | N | — |
| 44 | | | 40 | | Y | N |
| 45 | | | 45 | | Y | N |
| 46 | PE-4D | 21 | 20 | 40/60 DMF/THF | Y | Y |
| 47 | | | 30 | | Y | Y |
| 48 | | | 40 | | Y | Y |

TABLE 11-continued

LSISL membranes casting conditions and surface porosity assessment for membranes cast from DMF-containing solvent mixtures with no dioxane.

| Sample | Polymer | Wt. % | Evaporation Time (s) | Solvent (w/w) | Topography by AFM Suggestive of Nanoporosity | Highly Ordered Features by AFM |
|---|---|---|---|---|---|---|
| 49 | PE-4D | 18 | 20 | 60/40 DMF/THF | Y | N |
| 50 | | | 30 | | Y | N |
| 51 | | | 35 | | Y | N |
| 52 | PE-4E | 18 | 20 | 40/60 DMF/THF | Y | Y |
| 53 | | | 30 | | Y | N |
| 54 | | | 40 | | Y | N |
| 55 | PE-4E | 21 | 20 | 40/60 DMF/THF | Y | N |
| 56 | | | 30 | | Y | Y |
| 57 | | | 40 | | Y | N |
| 58 | PE-4E | 12 | 20 | 50/50 DMF/THF | Y | N |

Testing of LSISL Membrane Sample for Retention

Figure 4:
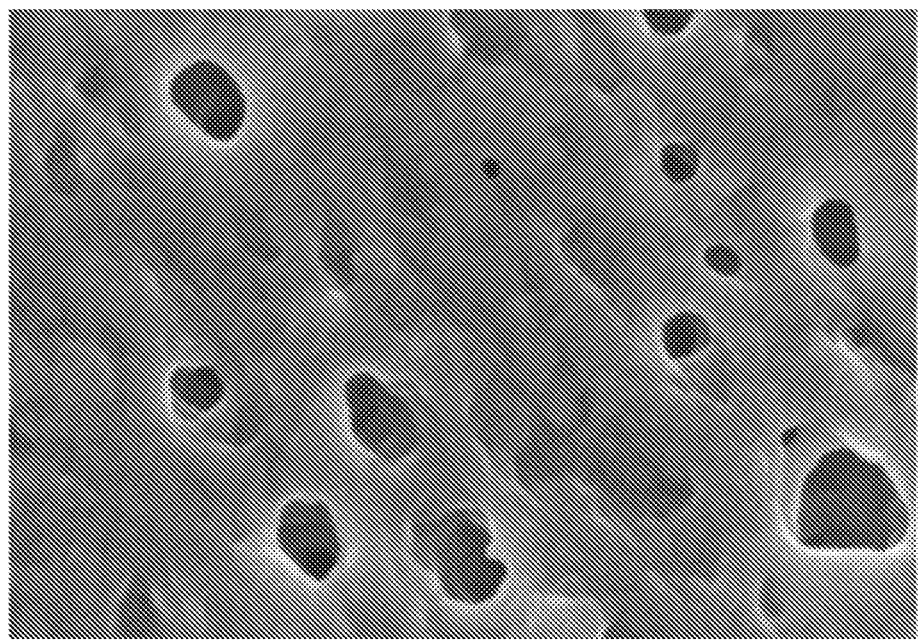
FIG. 4 is an SEM image of a surface of another membrane prepared according to an exemplary embodiment of the present disclosure.
Figure 5:
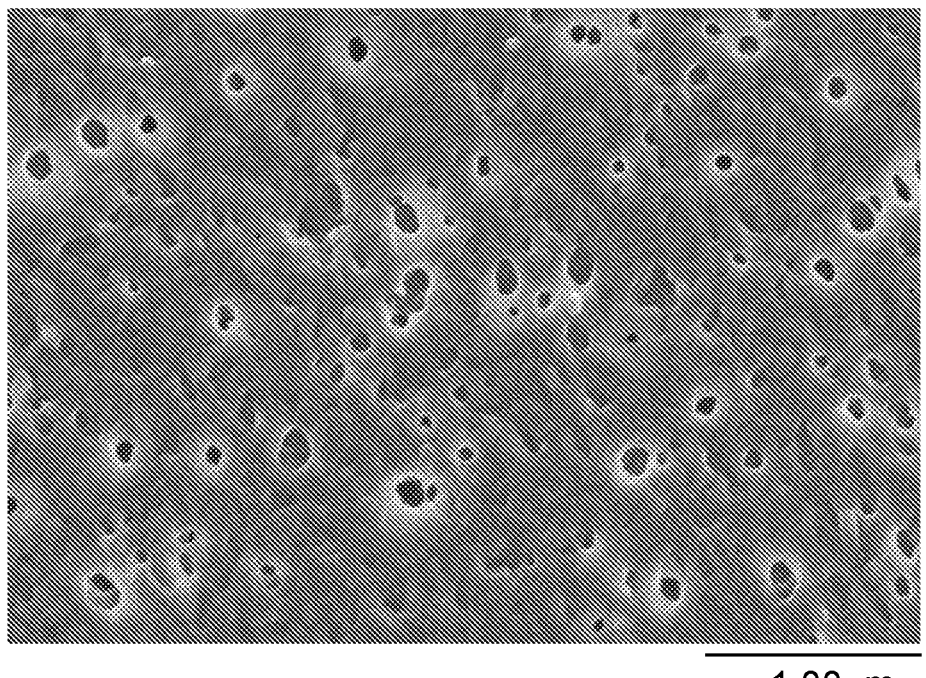
FIG. 5 is an SEM image of a surface of a further membrane prepared according to an exemplary embodiment of the present disclosure.

Membrane 58 was tested for retention of a mixture of 200 nm and 500 nm latex beads (15717-15—POLYBEAD Hydroxylate Microspheres 0.20 μm and 07762-15—POLYBEAD Hydroxylate Microspheres 0.50 μm from PolySciences). The beads were diluted by a factor of 100× using MilliQ water and then combined to create a 0.052 wt. % challenge solution. Discs 25 mm in diameter were punched from the membrane and tested in a 10 mL Amicon stirred cell (EMD Millipore) with an open nonwoven scrim. The samples were challenged with the bead solution at 20 psi (137.9 kiloPascals) with 400 rpm stirring. The samples were conditioned by flowing through >20 mL of MilliQ water. A sharp reduction in flux was observed with introduction of the challenge solution. The first 1 mL permeate was discarded and the second 1 mL permeate was collected for measurement. The challenge and measurement solutions were analyzed by dynamic light scattering (Malvern Zetasizer) to determine relative count rates at identical measurement conditions. The samples showed 10-80% removal of the beads. Based on the pore sizes observed through surface SEM analysis of the membrane surface (see, e.g., FIG. 4), the incomplete removal of the beads is likely due to microscopic defects.

Triblock Copolymer Membranes for Comparative Testing

An ISL triblock copolymer membrane from PE-3A was prepared at identical conditions to Membrane 58 to give Membrane 59. The IS4V copolymer material was dissolved in 70/30 w/w dioxane/THF at 12 wt. % to obtain a clear, uniform casting solution. The solution was cast at 3.50 mL/minute on a lab-scale roll-to-roll coater onto a polyethylene terephthalate (PET) substrate at 1.33 feet per minute (0.41 meter per minute) using a notch bar coater with coating gap set at 8 mil (203.2 micrometers). A total time of 33 seconds elapsed between when the solution was coated and when it entered a DI water bath to undergo phase separation and form a membrane structure (Membrane 60). The membrane preparation conditions are listed below in Table 12 and the characterization of the IS4V polymer is provided below in Table 13. The surface of Membrane 60 from IS4V did not have a highly ordered appearance, and image analysis determined that it was not isoporous due to surface pores having a standard deviation of 7.6 nm and an average diameter of 17 nm.

TABLE 12

Comparative triblock copolymer membrane casting conditions.

| Sample | Polymer | Wt % | Evaporation Time (s) | Solvent (w/w) | Surface Porous/ Nanoporous | Highly Ordered Appearance |
|---|---|---|---|---|---|---|
| 59 | PE-3A | 12 | 20 | 50/50 DMF/THF | Y | N |
| 60 | IS4V | 12 | 33 | 70/30 dioxane/THF | Y | N |

TABLE 13

IS4V Polymer Characterization.

| Sample ID | Mass % Isoprene | Mass % Styrene | Mass % Final Component | GPC Mw (g/mol) | GPC PDI |
|---|---|---|---|---|---|
| IS4V | 20.9 | 61.6 | 17.5 | 94300 | 1.05 |

Comparative Tensile Testing with Triblock Copolymer Membranes

Tensile measurements were performed on membrane samples using a 5544 Instron with a 5 N load cell. Membranes were cut into strips ¼ inches (0.64 cm) wide by ~1-2 inches (~2.54-5.08 cm) long. The strips were tested in the transverse direction (perpendicular to the direction that they were cast) at a rate of 1 mm/minute using a 0.5 inch (1.27 cm) initial gauge length for the ISL/LSISL samples and 1 inch (2.54 cm) initial gauge length for the IS4V samples. The ISL/LSISL membranes were tested in the dry state. The IS4V comparative samples were found to fracture when loading samples in the dry state, and were therefore tested in a water-wetted state. Samples of IS4V were soaked in milliQ water for several minutes prior to testing, were removed immediately prior to loading, and were tested within 30 seconds of removal. No effort was made to control evaporation during the tensile test. Two to six replicates were tested for each sample.

Figure 6:
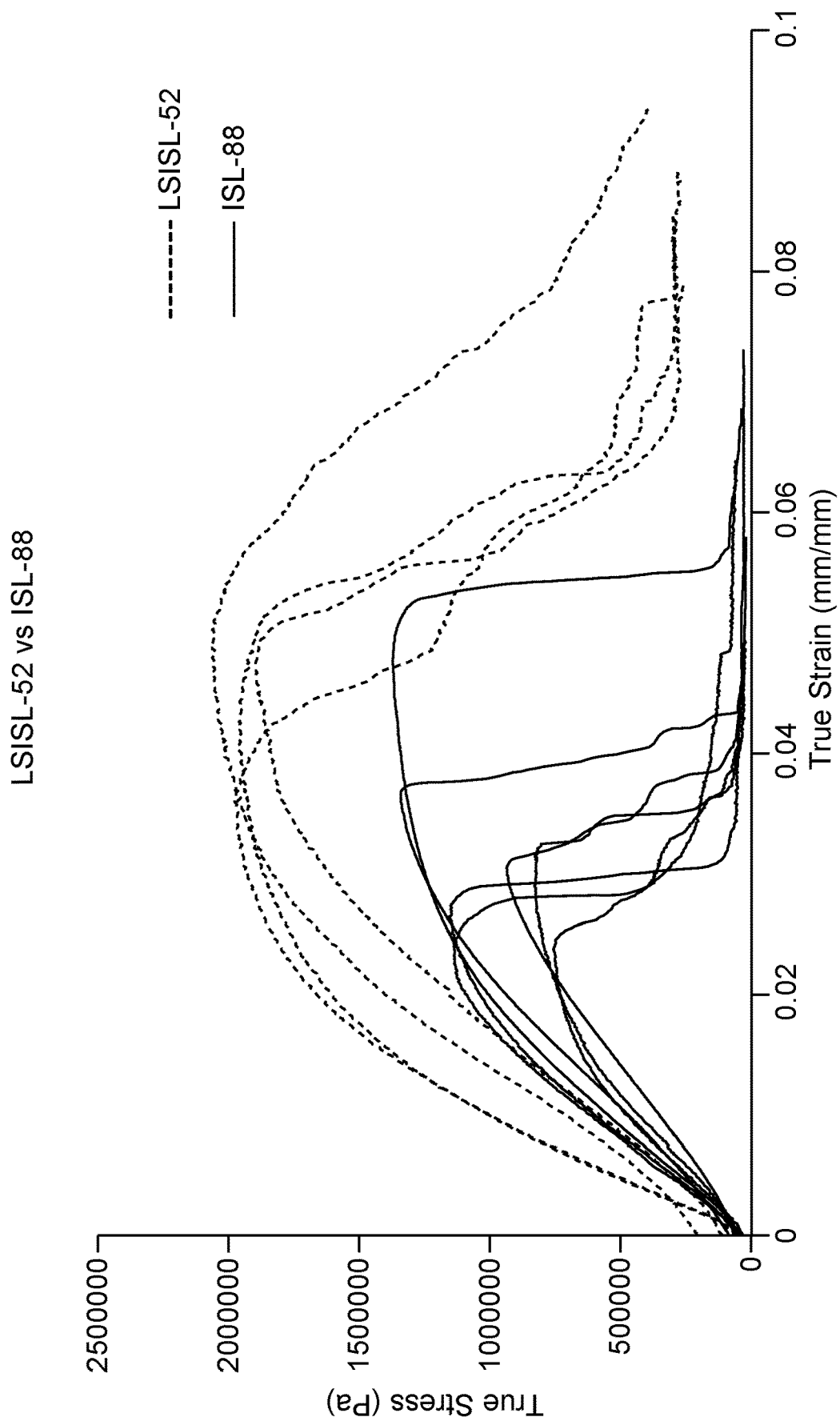
FIG. 6 is a graph of representative true stress—true strain curves for the membrane of FIGS. 1B, 2B, and 3, and a comparative membrane.

True stress-true strain curves for LSISL Membrane 52 and ISL membrane 59 prepared at identical conditions are shown in FIG. 6 while the average toughness results are summarized in Table 14. The LSISL samples appear to be about three times tougher than the ISL sample.

TABLE 14

| Sample | Toughness (kJ/m$^3$) | Std dev (kJ/m$^3$) |
|---|---|---|
| LSISL Membrane 52 | 100 | 20 |
| ISL Membrane 59 | 30 | 10 |

Figure 7:
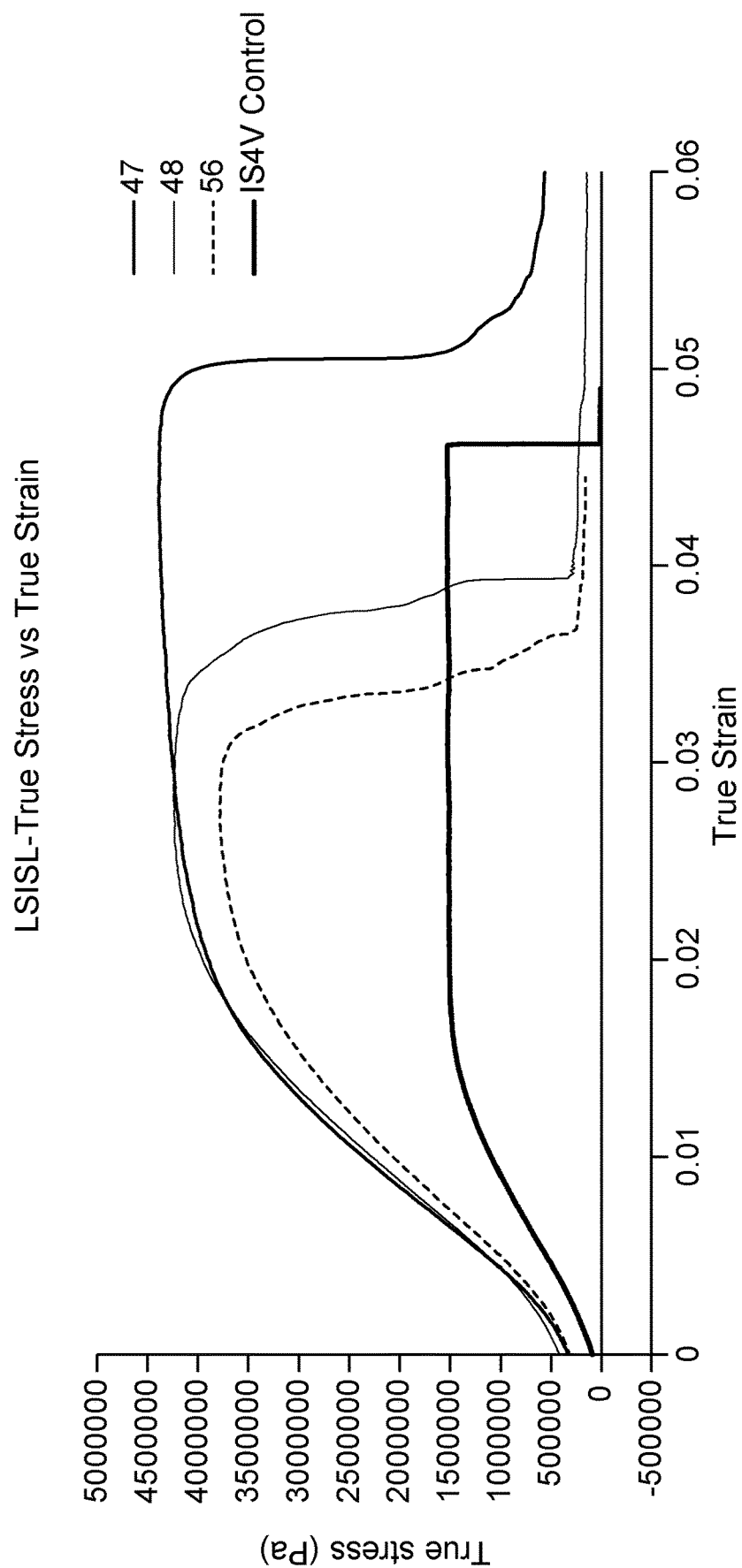
FIG. 7 is a graph of representative true stress—true strain curves for several membranes prepared according to exemplary embodiments of the present disclosure and a comparative membrane.

For LSISL and IS4V membrane samples prepared from conditions giving more ordered surface structures, representative true stress-true strain curves are shown in FIG. 7 and the average areas under the true stress-true strain curves are summarized in Table 15 below. The dry LSISL samples appear 2-3 times tougher than the wet IS4V sample. The dry IS4V sample was so brittle that it could not be loaded for testing.

TABLE 15

Average areas under true stress-true strain curves for dry LSISL PE-4D (Membranes 47 and 48), LSISL PE-4E (Membrane 56) and wet IS4V (Membrane 60).

| Sample | Toughness (kJ/m$^3$) | Std dev (kJ/m$^3$) |
|---|---|---|
| 47 | 110 | 20 |
| 48 | 80 | 20 |
| 56 | 160 | 30 |
| 60 | 30 | 9 |

Casting of OSISO Materials

OSISO PE-6A and PE-6B pentablock copolymers were dissolved in various solvent mixtures at concentrations from 12-18 wt. % and cast using a coating gap of 8 mil (203.2 micrometers) with evaporation periods from 0-60 seconds at the conditions listed in Table 16. A range of results were seen, including disintegration, gelation giving clear dry films, and a few opaque films with pore structures (e.g., membranes). Samples that did not disintegrate remained attached to the plastic coating support. Casting of the (unoptimized) membranes from few of the numerous conditions tested illustrates the non-trivial achievement of membrane formation.

TABLE 16

OSISO membrane casting conditions and AFM surface assessment.

| Sample | Polymer | Solvent | Concentration | Evap. Time | Comments | Appearance by AFM |
|---|---|---|---|---|---|---|
| 61 | PE-6A | 60/40 THF/DMF | 12 wt % | 20 s | Dried clear | — |
| 62 | | | | 40 s | Dried clear | — |
| 63 | PE-6B | 50/50 MeTHF/NMP | 18 wt % | 0 s | Opaque | Some pores |
| 64 | | | | 20 s | Opaque/translucent | — |
| 65 | | | | 40 s | Dried clear | — |
| 66 | | 70/30 MeTHF/NMP | 18 wt % | 10 s | Opaque | Some pores |
| 67 | | | | 20 s | Translucent | Open pore structure |
| 68 | | | | 40 s | Translucent | — |
| 69 | | | 21 wt % | 20 s | Translucent | Wormlike structures |
| 70 | | | | 40 s | Opaque | Wormlike structures |
| 71 | | | | 60 s | Translucent | — |
| 72 | | 25/25/50 MeTHF/NMP | 18 wt % | 0 s | Opaque | — |
| 73 | | | | 20 s | Clear/translucent | — |
| 74 | | | | 40 s | Dried clear | — |
| 75 | | | 12 wt % | 20 s | Disintegrated | — |
| 76 | | 50/38/12 MEK/DMAc/Sulfolane | 15 wt % | 20 s | Disintegrated | — |
| 77 | | 100/38/12 MEK/DMAc/Sulfolane | 15 wt % | 20 s | Disintegrated | — |
| 78 | | 150/38/12 MEK/DMAc/Sulfolane | 15 wt % | 20 s | Disintegrated | — |
| 79 | | 200/38/12 MEK/DMAc/Sulfolane | 15 wt % | 0 s | Disintegrated | — |
| 80 | | | | 20 s | Disintegrated | — |

Formation of Membranes from PSISP Copolymer from 30/70 THF/NMP Solvent Mixtures

PSISP PE-7 block copolymer was dissolved in solvent mixtures of 30/70 THF/NMP at concentrations from 10-16 wt. % and cast with evaporation periods from 10-25 seconds at the conditions listed in Table 17. The coatings became opaque and detached from the plastic support sheet while in the bath. Following removal from the water bath and drying, samples were examined by AFM to assess the surface morphology. These samples showed larger, micron-scale features. Samples were wetted by a sessile water drop.

TABLE 17

PSISP PE-7 membranes casting conditions and AFM surface assessment for membranes cast from 30/70 THF/NMP solvent mixtures.

| Sample | Concentration | Thickness | Evaporation Time | Appearance by AFM |
|---|---|---|---|---|
| 81 | 10 wt % | 8 mil | 10 s | Large features |
| 82 | | | 15 s | Large features |

TABLE 17-continued

PSISP PE-7 membranes casting conditions and AFM surface assessment for membranes cast from 30/70 THF/NMP solvent mixtures.

| Sample | Concentration | Thickness | Evaporation Time | Appearance by AFM |
|---|---|---|---|---|
| 83 | | | 20 s | Large features |
| 84 | | | 25 s | Large features |
| 85 | 12 wt % | 8 mil | 10 s | Large features |
| 86 | | | 15 s | Large features |
| 87 | | | 20 s | Large features |
| 88 | | | 25 s | Large features |
| 89 | 14 wt % | 8 mil | 10 s | Large features |
| 90 | | | 15 s | Large features |
| 91 | | | 20 s | Large features |
| 92 | 16 wt % | 8 mil | 10 s | Large features |
| 93 | | | 15 s | Large features |
| 94 | | | 20 s | Large features |

Formation of Membranes from PSISP Copolymer from 50/50 THF/DMF Solvent Mixtures

PSISP PE-7 block copolymer was dissolved in a solvent mixture of 50/50 THF/DMF at a concentration of 10 wt. % and cast with evaporation periods from 10-15 seconds at the conditions listed in Table 18. The coatings became opaque and detached from the plastic support sheet while in the bath. Following removal from the water bath and drying, samples were examined by AFM to assess the surface morphology. These samples showed larger, micron-scale features. Samples were wetted by a sessile water drop.

TABLE 18

PSISP PE-7 membranes casting conditions and AFM surface assessment for membranes cast from 50/50 THF/DMF solvent mixtures.

| Sample | Concentration | Thickness | Evaporation Time | Appearance by AFM |
|---|---|---|---|---|
| 95 | 10 wt % | 8 mil | 10 s | Large features |
| 96 | | | 15 s | Large features |

Formation of Membranes from PSISP Copolymer from MEK/NMP Solvent Mixtures

PSISP PE-7 block copolymer was dissolved in solvent mixtures of MEK/NMP at concentrations from 10-14 wt. % and cast with evaporation periods from 10-30 seconds at the conditions listed in Table 19. The coatings became opaque and detached from the plastic support sheet while in the bath. Following removal from the water bath and drying, samples were examined by AFM to assess the surface morphology. These samples showed larger, micron-scale features. Samples were wetted by a sessile water drop.

TABLE 19

PSISP PE-7 membranes casting conditions and AFM surface assessment for membranes cast from MEK/NMP solvent mixtures.

| Sample | MEK/NMP Ratio | Concentration | Thickness | Evaporation Time | Appearance by AFM |
|---|---|---|---|---|---|
| 97 | 30/70 | 10 wt % | 8 mil | 10 s | Large features |
| 98 | | | | 15 s | Large features |
| 99 | | | | 20 s | Large features |
| 100 | | | | 25 s | Large features |
| 101 | | 14 wt % | 8 mil | 10 s | Large features |
| 102 | | | | 15 s | Large features |
| 103 | | | | 20 s | Large features |
| 104 | 40/60 | 12 wt % | 6 mil | 15 s | Large features |
| 105 | | | | 30 s | Large features |

Formation of Membranes from PSISP Copolymer from 30/70 Dioxane/NMP Solvent Mixtures PSISP PE-7 block copolymer was dissolved in solvent mixtures of 30/70 dioxane/NMP at concentrations from 10-14 wt. % and cast with evaporation periods from 10-30 seconds at the conditions listed in Table 20. The coatings became opaque and detached from the plastic support sheet while in the bath. Following removal from the water bath and drying, samples were examined by AFM to assess the surface morphology. These samples showed larger, micron-scale features. Samples were wetted by a sessile water drop.

TABLE 20

PSISP PE-7 membranes casting conditions and AFM surface assessment for membranes cast from 30/70 Dioxane/NMP solvent mixtures.

| Sample | Concentration | Thickness | Evaporation Time | Appearance by AFM |
|---|---|---|---|---|
| 107 | 10 wt % | 8 mil | 10 s | Large features |
| 108 | | | 15 s | Large features |
| 109 | | | 20 s | Large features |
| 110 | 12 wt % | 8 mil | 10 s | Large features |
| 111 | | | 15 s | Large features |
| 112 | | | 20 s | Large features |
| 113 | 14 wt % | 8 mil | 10 s | Large features |
| 114 | | | 15 s | Large features |

Protein Binding of PSISP Membranes

A subset of PSISP membranes were assessed for their binding of bovine serum albumin (BSA) protein. A sample of MEMBRANA MicroPES 2F (3M Company, St. Paul, Minn.) was used as a comparative sample. Ten millimeter discs or 1.5 mg pieces of PPO pentablock membranes were placed into sterile, nontreated 48 well plates (Thermo Fisher Scientific, Roskilde, Denmark). Triplicate samples of each membrane were evaluated for protein binding. Protein solution (200 µl of 1 mg/ml bovine serum albumin in PBS, pH 7.4; Sigma-Aldrich, St. Louis, Mo., USA) was added to each well, which covered the membrane material. The plate was shaken slightly at room temperature for 1 hour on a titer plate shaker (Lab-Line Instrument Inc, Melrose Park, Ill., USA). After 1 hour incubation, the protein solution was decanted and membrane material were washed three times using phosphate-buffered saline (PBS). Remaining PBS was pipetted out of each well. Quantification of protein bound to the membrane was determined by using a Pierce™ BCA Protein Assay Kit according to manufacturer's protocol with slight modifications. BCA assay kit reagent mixture (200 µl) was directly added to each well containing membrane material. The plate was incubated at 37° C. for 30 minutes. After color development, 150 µl aliquots of solution were transferred to a 96-well plate (Greiner Bio-One, Kremsmunster, Austria). Absorbance was measured at 562 nm using a microplate reader (Molecular Devices, Sunnyvale, Calif., USA). Results are shown in Table 21.

TABLE 21

BSA binding results for PSISP membranes and MicroPES 2F comparative.

| Sample | BSA bound (μg/mg) | | BSA bound (μg/cm²)* | |
|---|---|---|---|---|
| | AVG | SD | AVG | SD |
| 93 | 21.2 | 7.4 | 40.5 | 14.0 |
| 101 | 45.3 | 11.6 | 86.5 | 22.1 |
| 103 | 38.1 | 12.7 | 72.8 | 24.3 |
| 114 | 42.5 | 13.0 | 81.2 | 24.9 |
| MicroPES 2F | 15.2 | 1.2 | 56.0 | 4.4 |

*Assumed 1.5 mg was equivalent to 10 mm disc

Formation of Thin Membranes from PSISP Copolymer

PSISP PE-7 block copolymer was dissolved in 9 solvent mixtures at a concentration of 12 wt. % and coated at a coating gap of 2 mil (50.8 micrometers) (Table 22). All the coating films dewet on the polymer support at this coating thickness within the intended evaporation time (~10 s).

TABLE 22

PSISP PE-7 thin membranes casting conditions.

| Sample | Solvent | Concentration | Thickness | Comments |
|---|---|---|---|---|
| 115 | 40/60 MEK/NMP | 12 wt % | 2 mil | Dewet |
| 116 | 40/60 THF/NMP | 12 wt % | 2 mil | Dewet |
| 117 | 40/60 Ethyl acetate/NMP | 12 wt % | 2 mil | Dewet |
| 118 | 40/60 MEK/DMAc | 12 wt % | 2 mil | Dewet |
| 119 | 40/60 THF/DMAc | 12 wt % | 2 mil | Dewet |
| 120 | 40/60 Ethyl acetate/DMAc | 12 wt % | 2 mil | Dewet |
| 121 | 40/60 MEK/DMF | 12 wt % | 2 mil | Dewet |
| 123 | 40/60 THF/DMF | 12 wt % | 2 mil | Dewet |
| 124 | 40/60 Ethyl acetate/DMF | 12wt % | 2 mil | Dewet |

Formation of PSISP Thin Composite Membranes

PSISP PE-7 block copolymer was dissolved in solvent mixtures at concentrations from 10-14 wt. % and cast using a gap coater with a gap of 2 mil (50.8 micrometers) onto commercial porous supports (Teslin SP 700 (PPG Industries, Inc., Pittsburgh, Pa.) and PAN 350E (Nanostone Water, Inc., Eden Prairie, Minn.)). A period of 0-10 seconds was allowed for evaporation before introducing the coated structure into a water bath. Following removal from the water bath and drying, the samples were examined by AFM to assess the surface morphology.

Thin Composite Membranes from 40/60 MEK/NMP

Figure 13A:
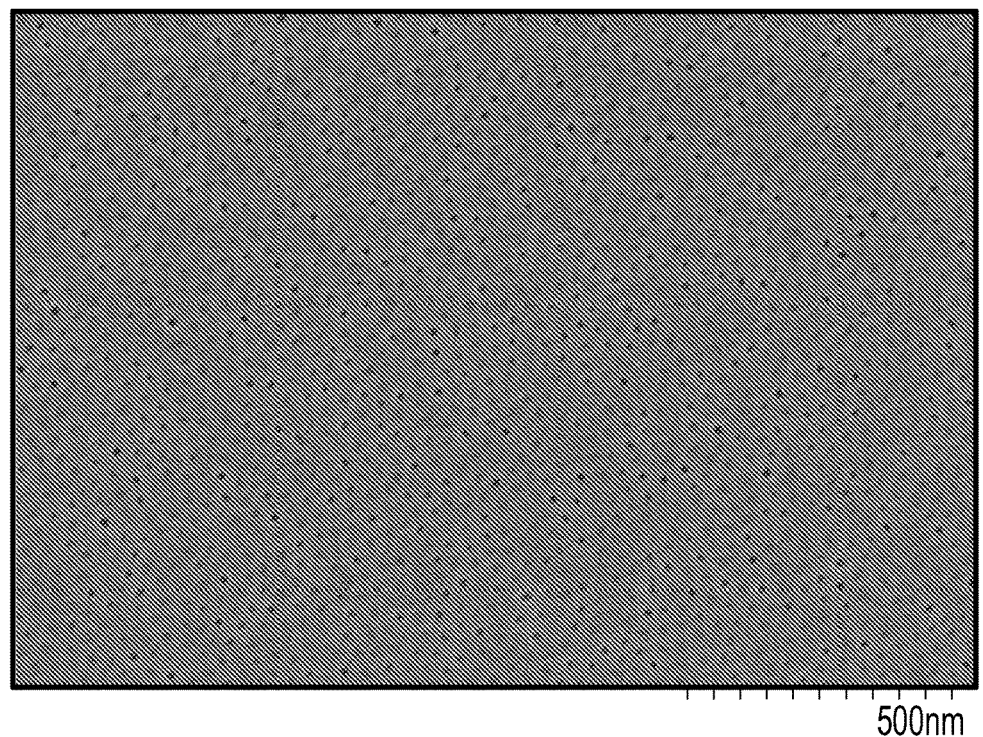
FIG. 13A is an SEM image of the surface of the membrane of FIG. 11.
Figure 13B:
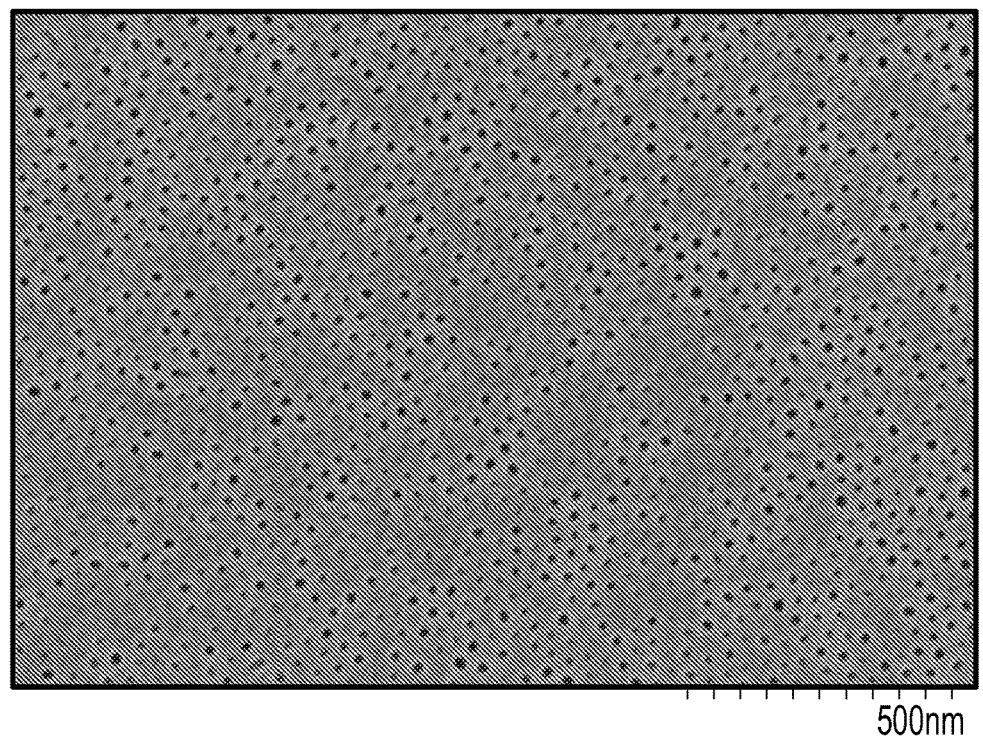
FIG. 13B is an SEM image of the surface of the membrane of FIG. 12.
Figure 14:
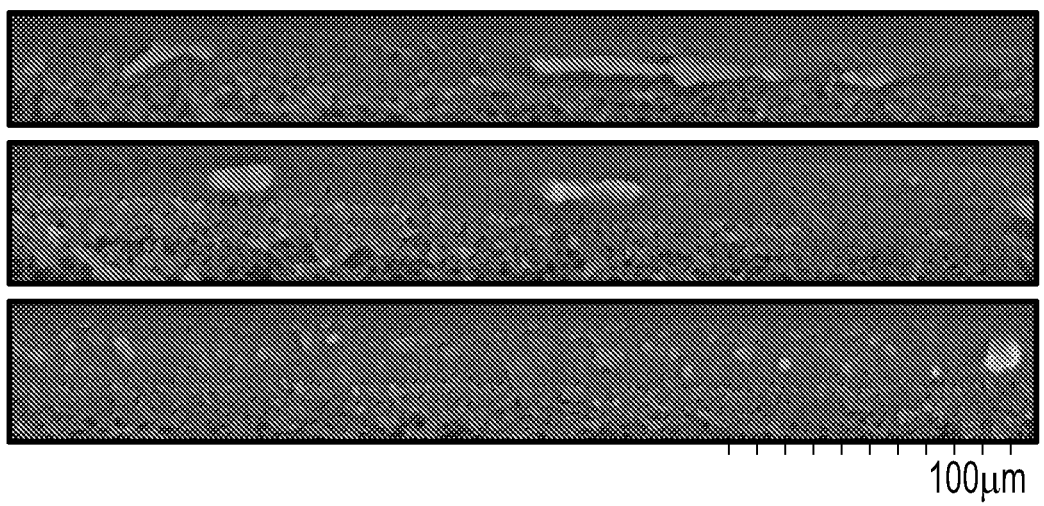
FIG. 14 is SEM images of the cross section of the membranes of FIGS. 11-12.

PSISP PE-7 block copolymer was dissolved in solvent mixtures of 40/60 MEK/NMP at concentrations from 10-14 wt. % and cast with evaporation periods from 0-10 seconds at the conditions listed in Table 23. For all samples, hexagonally-packed, high-contrast dot features were seen by AFM (see FIGS. 8 and 9). Pore size analysis of Membranes 132 and 136 showed pore sizes of 20±5 nm and 23±5 nm, respectively. A subset of samples were also examined by high-resolution SEM and obvious hexagonally-packed dot features were seen where up to half of the features appear to be open pores (see FIGS. 10 and 13). High-resolution SEM cross-sectional imaging was also carried out on Membrane 132 (FIG. 14). Results show what appear to be a largely dense subsurface for the PSISP coating.

As shown above, various PPO pentablock copolymers formed micron-scale pore structures when cast as free standing membranes at a wet coating thickness of 6-8 mil (152.4-203.2 micrometers) over many different conditions. Surprisingly, when the same or similar solutions were cast onto porous supports at 2 mil (50.8 micrometers) thickness, nanoscale isoporous surface features were observed over many different conditions. It is not believed that this type of behavior has been reported in any other block copolymer SIPS membrane material sets. Typically, thicker coatings and thinner coatings yield similar structures (see, e.g., ACS Appl. Mater. Interfaces 2015, 7, 21130-21137; J. Mater. Chem. A, 2017, 5, 3358-3370).

Figure 8:
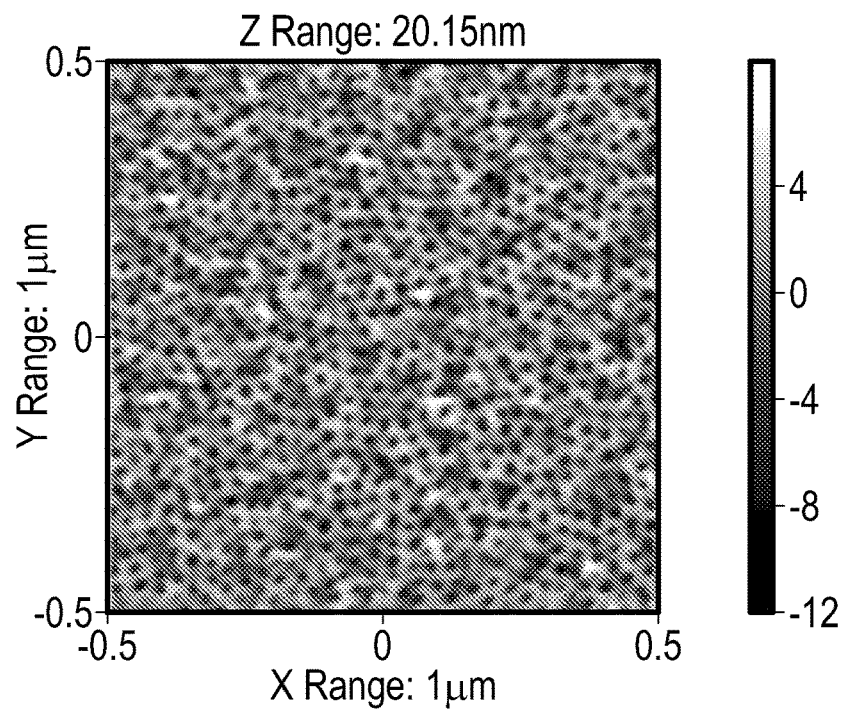
FIG. 8 is an AFM topography image of the surface of yet another membrane prepared according to an exemplary embodiment of the present disclosure.
Figure 9:
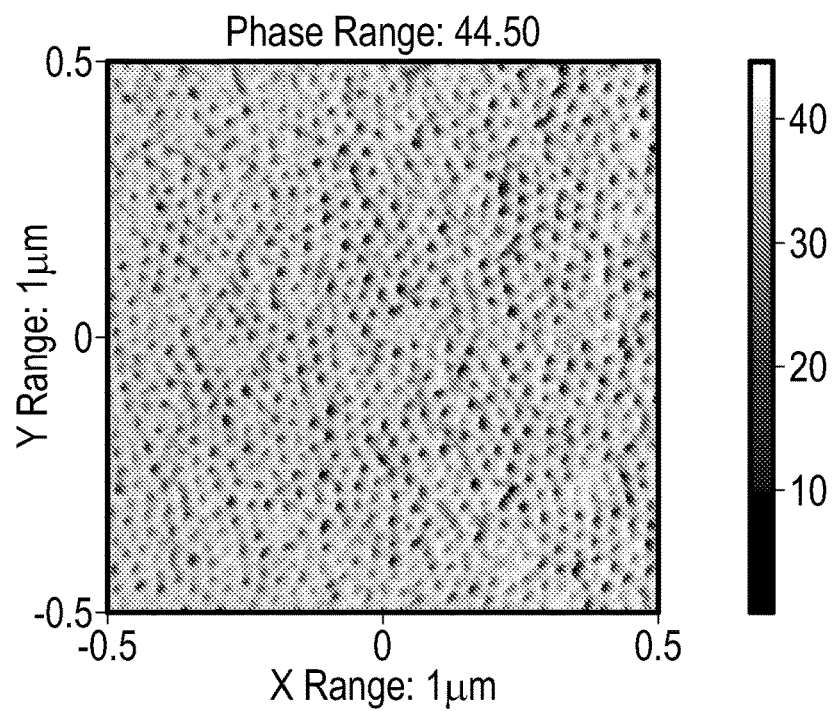
FIG. 9 is an AFM phase image of the surface of the membrane of FIG. 8.
Figure 10:
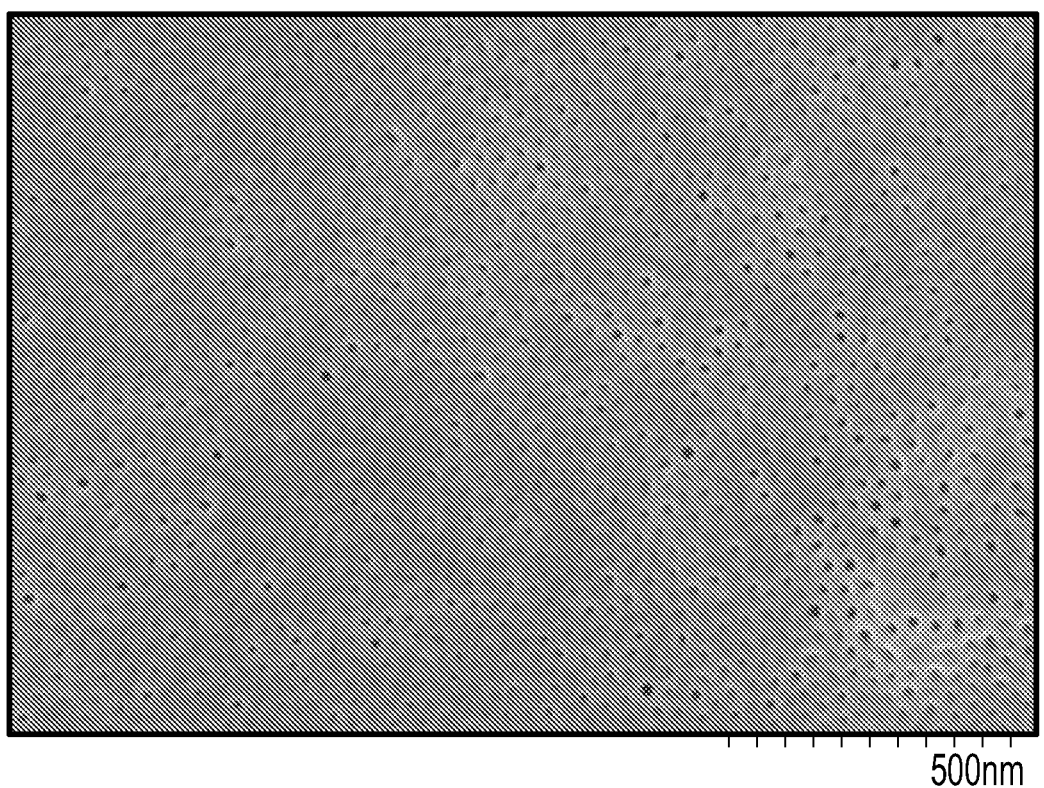
FIG. 10 is an SEM image of the surface of the membrane of FIGS. 8 and 9.

FIG. 8 is an AFM topography image of the surface of Sample 126; FIG. 9 is an AFM phase image of the surface of Membrane 126; and FIG. 10 is a scanning electron microscope (SEM) image of the surface of the Membrane 126.

Figure 11:
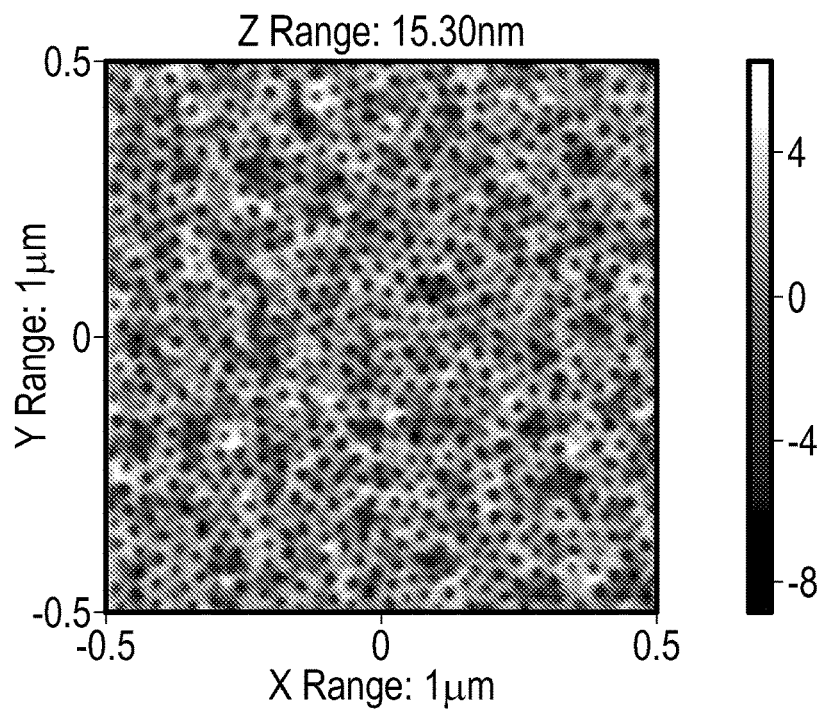
FIG. 11 is an AFM topography image of the surface of a still further membrane prepared according to an exemplary embodiment of the present disclosure.
Figure 12:
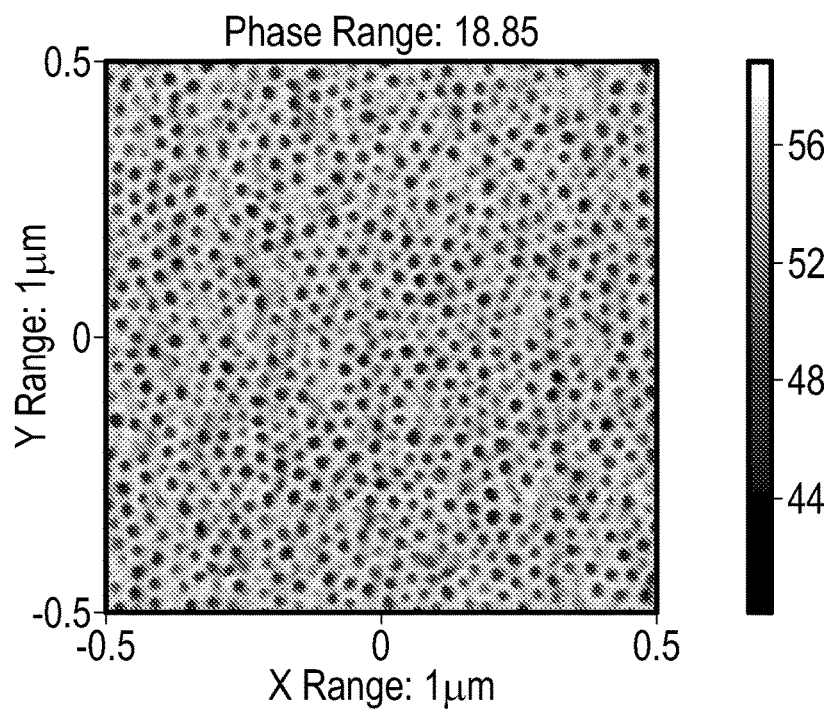
FIG. 12 is an AFM phase image of the surface of the membrane of FIG. 11.

FIG. 11 is an AFM topography image of the surface of Sample 66; FIG. 12 is an AFM phase image of the surface of Membrane 132; FIGS. 13A and 13B are scanning electron microscope (SEM) images of the surface of the Membrane 132; and FIG. 14 are scanning electron microscope (SEM) images of the cross section of the Membrane 132.

TABLE 23

PSISP PE-7 membranes casting conditions, AFM surface assessment and SEM surface assessment for membranes cast from 40/60 MEK/NMP solvent mixtures.

| Sample | Concentration | Substrate | Thickness | Evap. Time | Appearance by AFM | Appearance by SEM |
|---|---|---|---|---|---|---|
| 125 | 10 wt % | Teslin | 2 mil | 10 s | Hexagonally-packed, high-contrast dot features | |
| 126 | 12 wt % | Teslin | 2 mil | 10 s | Hexagonally-packed, high-contrast dot features | Obvious hexagonally-packed dot features, small minority appear to be open pores |
| 127 | 14 wt % | Teslin | 2 mil | 10 s | Hexagonally-packed, high-contrast dot features | |
| 128 | 10 wt % | PAN | 1 mil | 10 s | Hexagonally-packed, high-contrast dot features | |
| 129 | 10 wt % | PAN | 1 mil | 0 s | Hexagonally-packed, high-contrast dot features | |
| 130 | 12 wt % | PAN | 1 mil | 10 s | Hexagonally-packed, high-contrast dot features | |
| 131 | 12 wt % | PAN | 1 mil | 0 s | Hexagonally-packed, high-contrast dot features | |

TABLE 23-continued

PSISP PE-7 membranes casting conditions, AFM surface assessment and SEM surface assessment for membranes cast from 40/60 MEK/NMP solvent mixtures.

| Sample | Concentration | Substrate | Thickness | Evap. Time | Appearance by AFM | Appearance by SEM |
|---|---|---|---|---|---|---|
| 132 | 12 wt % | PAN | 2 mil | 10 s | Hexagonally-packed, high-contrast dot features | Obvious hexagonally-packed dot features, approximately half appear to be open pores |
| 133 | 12 wt % | PAN | 2 mil | 0 s | Hexagonally-packed, high-contrast dot features | |
| 134 | 14 wt % | PAN | 1 mil | 10 s | Hexagonally-packed, high-contrast dot features | |
| 135 | 14 wt % | PAN | 1 mil | 0 s | Hexagonally-packed, high-contrast dot features | |
| 136 | 14 wt % | PAN | 2 mil | 10 s | Hexagonally-packed, high-contrast dot features | Obvious hexagonally-packed dot features, approximately half appear to be open pores |

Thin Composite Membranes from 30/70 MEK/NMP

PSISP PE-7 block copolymer was dissolved in solvent mixtures of 30/70 MEK/NMP at concentrations from 10-12 wt. % and cast onto Teslin with evaporation periods of 10 seconds at the conditions listed in Table 24. For both samples, hexagonally-packed, high-contrast dot features were seen by AFM.

TABLE 24

PSISP PE-7 membranes casting conditions and AFM surface assessment for membranes cast from 30/70 MEK/NMP solvent mixtures.

| Sample | Concentration | Substrate | Thickness | Evaporation Time | Appearance by AFM |
|---|---|---|---|---|---|
| 137 | 10 wt % | Teslin | 2 mil | 10 s | Hexagonally-packed, high-contrast dot features |
| 138 | 12 wt % | Teslin | 2 mil | 10 s | Hexagonally-packed, high-contrast dot features |

Thin Composite Membrane from 40/60 THF/DMAc

PSISP PE-7 block copolymer was dissolved in a solvent mixture of 40/60 THF/DMAc at a concentration of 12 wt. % and cast onto Teslin with evaporation periods of 10 seconds (Table 25). Hexagonally-packed, high-contrast dot features were seen by AFM. Additional evaluation by SEM showed subtle hexagonally-packed dot features, although very few appeared to be open pores.

TABLE 25

PSISP PE-7 membrane casting conditions, AFM surface assessment and SEM surface assessment for membranes cast from a 40/60 THF/DMAc solvent mixture.

| Sample | Concentration | Substrate | Thickness | Evaporation Time | Appearance by AFM | Appearance by SEM |
|---|---|---|---|---|---|---|
| 139 | 12 wt % | Teslin | 2 mil | 10 s | Packed lower-contrast dot features | Subtle hexagonally-packed dot features, very few appear to be open pores |

Thin Composite Membrane from 40/60 MEK/DMAc

PSISP PE-7 block copolymer was dissolved in a solvent mixture of 40/60 MEK/DMAc at a concentration of 12 wt. % and cast onto Teslin with evaporation periods of 10 seconds (Table 26). Hexagonally-packed, high-contrast dot features were seen by AFM. Additional evaluation by SEM showed obvious hexagonally-packed dot features where the minority appeared to be open pores.

TABLE 26

PSISP PE-7 membrane casting conditions, AFM surface assessment and SEM surface assessment for a membrane cast from a 40/60 MEK/DMAc solvent mixture.

| Sample | Con-centration | Sub-strate | Thick-ness | Evaporation Time | Appearance by AFM | Appearance by SEM |
|---|---|---|---|---|---|---|
| 140 | 12 wt % | Teslin | 2 mil | 15 s | Hexagonally-packed high-contrast dot features | Obvious hexagonally-packed dot features, minority appear to be open pores |

Comparative Pore Sizes in Air Vs. Water Environments

Peak Force Tapping Mode AFM in air versus water environments was performed on thin composite membrane samples 132 and 136 (on PAN substrate). For residence times up to 30 minutes, the images obtained in water showed pores with average pore sizes unchanged from those observed in air.

Figure 15:
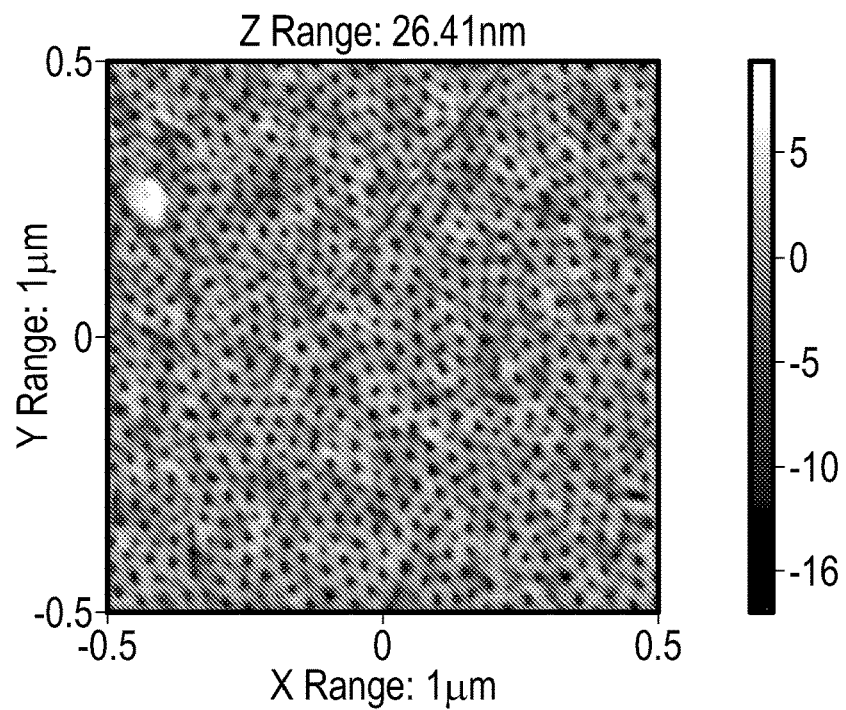
FIG. 15 is an AFM topography image of the surface of the membrane of FIGS. 11-14 in an air environment.
Figure 16:
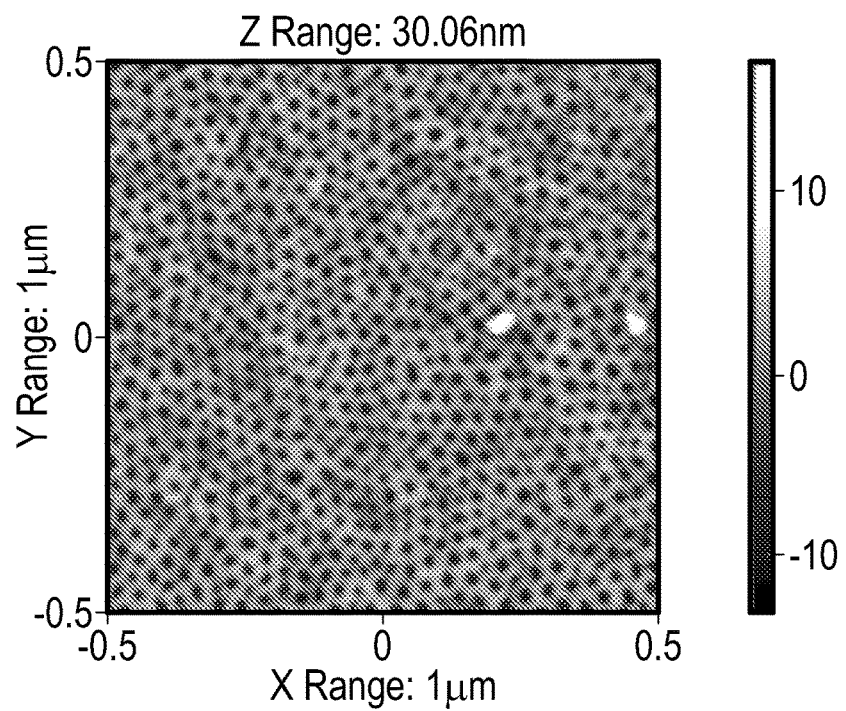
FIG. 16 is an AFM topography image of the membrane of FIG. 15 after 15 minutes residence time in a water environment.

It is noted that polymer membranes prepared from PEO copolymers have shown high hydrophilicity, to the point that the PEO lining the pore walls of the membrane structure can swell substantially in the presence of water, substantially limiting the overall flux (see, e.g., J. Polym. Sci., Part B: Polym. Phys. 2013, 51, 281-290). One approach to minimizing the impact of PEO pore swelling has been to limit the fraction of PEO to below 5 wt % within a triblock structure (Macromol. Rapid Commun. 2013, 34, 610-615) or to below 13 wt % in a diblock structure (J. Membrane Sci. 453 (2014) 471-477). It was surprising to observe that the PPO pentablock membranes examples generated here with 27 wt % PPO were hydrophilic, yet showed no pore size change when examined in air vs. water environments. FIG. 15 is an AFM topography image of the surface of Membrane 132 in an air environment, and FIG. 16 is an AFM topography image of the surface of Membrane 132 after 15 minutes residence time in a water environment.

Flux and Retention Testing Procedure for Thin Composite Membranes Coated on PAN Substrates Challenge solutions were prepared by dissolving dextran of different molecular weights in MilliQ-grade water (6 kDa at 0.04 wt %, 40 kDa at 0.04 wt %, 100 kDa at 0.025 wt %, 500 kDa at 0.035 wt % and 2000 kDa at 0.095 wt %). Thin composite membrane samples were cut into 44-mm diameter discs and pre-wet with water. The samples were placed into an Amicon 8050 stirred-cell holder (EMD Millipore 5122). Stirring was applied by a magnetic stir-plate (Corning PC-420D) and pressure was applied using laboratory compressed air through a regulator (Ingersoll-Rand R37121-100). Samples were initially conditioned by running with MilliQ-grade water at 20 psi (137.9 kPa) with stirring >200 rpm for a minimum of 40 mL or 15 minutes. Flux was measured at this point. The dextran solution was then applied at 10 or 20 psi (68.9 or 137.9 kPa) with stirring >200 rpm. The feed and permeate solutions were analyzed using an aqueous gel permeation chromatography system (Agilent Technologies 1260 Infinity with PL Aquagel-OH 40 columns) to compare their dextran content as a function of elution time. The column was calibrated using PEO standards.

Figure 17:
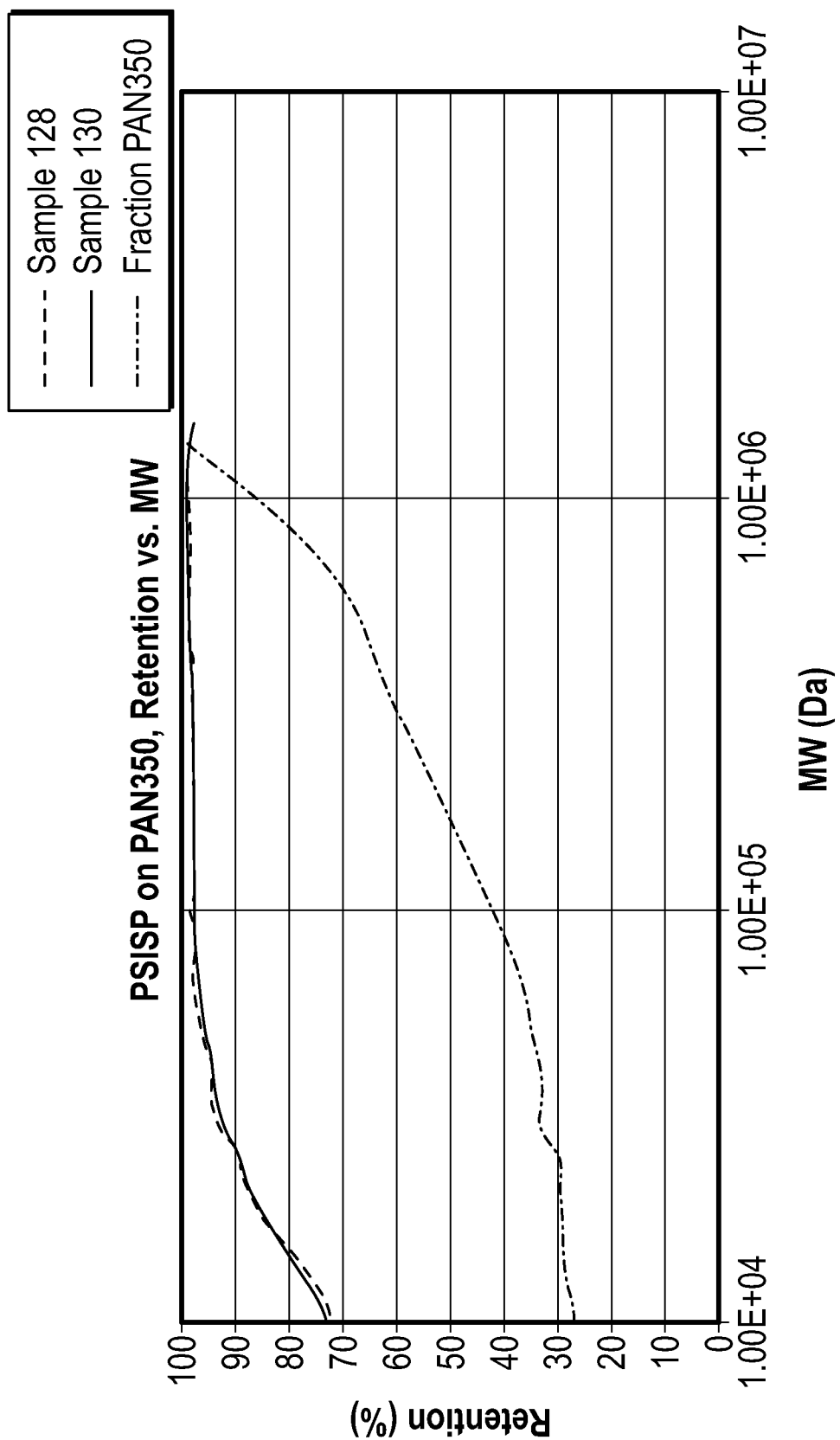
FIG. 17 is a graph of retention curves as a function of molecular weight for two membranes prepared according to an exemplary embodiment of the present disclosure and for a PAN substrate.

Fluxes measured for the samples ranged from ~0.5 to 2.5 (Liters/m$^2$/h)/bar (5 to 25 (Liters/m$^2$/h)/MPa) (Table 27). The retention curves for all the samples tested look quite similar, showing 80% retention at 15 kDa and 90% retention at 26 kDa. Representative retention curves as a function of molecular weight for Membranes 128 and 130 are shown in FIG. 17.

TABLE 27

Flux of PSISP thin composite membranes cast onto PAN substrate.

| Sample | Flux (Liters/m$^2$/h)/bar |
|---|---|
| 128 | 2.40 |
| 129 | 0.63 |
| 130 | 1.15 |
| 131 | 1.62 |
| 132 | 0.93 |
| 133 | 0.58 |
| 134 | 1.14 |

What is claimed is:

1. A porous membrane comprising an ABCBA block copolymer and at least one additive in an amount ranging from 1 weight percent to 49 weight percent of the total weight of the porous membrane, the porous membrane comprising a plurality of pores;
   wherein the A block is immiscible with each of the B block and the C block;
   wherein the B block has a T$_g$ of 90 degrees Celsius or greater and is present in an amount ranging from 30% to 80% by weight, inclusive, of the total block copolymer, wherein the B block comprises a vinyl aromatic; and
   wherein the C block has a T$_g$ of 25 degrees Celsius or less and is present in an amount ranging from 10% to 40% by weight, inclusive, of the total block copolymer.

2. The porous membrane of claim 1, wherein the pores comprise an average pore size at a surface of the membrane ranging from 1 nanometer (nm) to 500 nm, inclusive.

3. The porous membrane of claim 1, wherein the membrane is isoporous and wherein a standard deviation in pore diameter at a surface of the membrane is 4 nm or less from a mean pore diameter at the surface of the membrane when the mean surface pore diameter ranges from 5 to 15 nm, the standard deviation in pore diameter at the surface of the membrane is 6 nm or less from the mean pore diameter at the surface of the membrane when the mean pore diameter at the surface of the membrane ranges from greater than 15 to 25 nm, and the standard deviation in pore diameter at the surface of the membrane is 25% or less of the mean pore diameter at the surface of the membrane when the mean pore diameter at the surface of the membrane ranges from greater than 25 to 50 nm.

4. The porous membrane of claim 1, wherein the A block comprises a poly(alkylene oxide), a substituted epoxide, a polylactam, or a substituted carbonate.

5. The porous membrane of claim 1, wherein the membrane exhibits a toughness of 30 kJ/m$^3$ or greater as a free-standing film when dry, as measured by integrating the area under a stress-strain curve for the membrane.

6. A method of making a porous membrane, the method comprising:
 forming a film or a hollow fiber from a solution, the solution comprising a solvent and solids comprising an ABCBA block copolymer and at least one additive in an amount ranging from 1 to 49 wt. % of the total solids;
 removing at least a portion of the solvent from the film or the hollow fiber; and
 contacting the film or the hollow fiber with a nonsolvent, thereby forming the porous membrane comprising a plurality of pores.

7. The method of claim 6, wherein the solvent is selected from the group consisting of dimethylformamide, dimethylacetamide, N-methylpyrrolidone, dimethylsulfoxide, tetrahydrofuran, 1,4-dioxane, 1,3-dioxane, tetrahydrothiophene 1,1-dioxide, methyl ethyl ketone, methyl tetrahydrofuran, sulfolane, and combinations thereof.

8. The method of claim 6, wherein forming the film comprises casting the solution on a substrate.

9. The method of claim 6, wherein forming the hollow fiber comprises spinning the solution into the hollow fiber.

10. The porous membrane of claim 1, wherein the A block is selected from the group consisting of poly(D-lactide), poly(L-lactide), poly(D/L-lactide), polyethyleneoxide, poly(propylene oxide), poly(ethyoxyethylglycidylether), poly(4-vinylpyridine), poly(2-vinylpyridine), polyhydroxystyrene, polyacrylamide, polyacrylic acid, poly(methacrylic acid), polydimethylacrylamide, poly(N-isopropylacrylamide), polyhydroxyethylmethacrylate, poly-ε-caprolactone, and poly(propylenecarbonate).

11. The porous membrane of claim 1, wherein the B block is selected from the group consisting of styrene, p-methylstyrene, alpha-methylstyrene, poly(tert-butylstyrene), and polymethylmethacrylate.

12. The porous membrane of claim 1, wherein the C block is selected from the group consisting of polyisoprene, polybutadiene, polyisobutylene, polydimethylsiloxane, polyethylene, poly(ethylene-alt-propylene), poly(ethylene-co-butylene-co-propylene), polybutylene, and poly(ethylene-stat-butylene).

13. The porous membrane of claim 1, wherein the pores at a surface of the membrane comprise an average pore size ranging from 5 nm to 50 nm, inclusive.

14. The porous membrane of claim 1, wherein the ABCBA block copolymer comprises a polydispersity ranging from 1.0 to 2.0, inclusive.

15. The method of claim 6, wherein the at least one additive is present and is selected from the group consisting of a homopolymer, a diblock copolymer, a triblock copolymer, and combinations thereof.

16. The method of claim 6, wherein the solvent comprises methyl ethyl ketone.

* * * * *